United States Patent [19]

Takashima et al.

[11] Patent Number: 5,140,445
[45] Date of Patent: Aug. 18, 1992

[54] IMAGING READING APPARATUS HAVING A PREHEATING SYSTEM

[75] Inventors: Izumi Takashima; Shinichiro Taga; Mitsuo Ohtaki, all of Kanagawa, Japan

[73] Assignee: Fuji Xerox Co., Ltd., Tokyo, Japan

[21] Appl. No.: 533,849

[22] Filed: Jun. 6, 1990

[30] Foreign Application Priority Data

Jun. 9, 1989 [JP] Japan .................. 1-147481

[51] Int. Cl.$^5$ .................. G03B 27/52; G03B 27/72
[52] U.S. Cl. .................. 358/483; 358/406; 358/213.16; 355/30; 355/69; 250/238
[58] Field of Search ............ 358/213.16, 482, 483, 358/406; 355/228, 30, 69; 250/238

[56] References Cited

U.S. PATENT DOCUMENTS

| | | | |
|---|---|---|---|
| 4,497,568 | 2/1985 | Koyima et al. | 355/208 |
| 4,739,409 | 4/1988 | Baumeister | 358/213.16 |
| 4,827,313 | 5/1989 | Corona | 355/30 |
| 4,887,122 | 12/1989 | Morikawa | 355/69 |
| 5,029,311 | 7/1991 | Brandkamp et al. | 355/30 |

FOREIGN PATENT DOCUMENTS

| | | | |
|---|---|---|---|
| 0038060 | 3/1982 | Japan | 358/213.16 |
| 0006237 | 1/1987 | Japan | 355/69 |
| 63-196158 | 8/1988 | Japan | . |

*Primary Examiner*—Edward L. Coles, Sr.
*Assistant Examiner*—Jill Jackson
*Attorney, Agent, or Firm*—Finnegan, Henderson, Farabow, Garrett and Dunner

[57] ABSTRACT

An image sensor is operable in a read state, a rest state, and a stand-by state. Control signal generating means generate a control signal. The control signal has a first constant preset level during the read state, a second preset level during the rest state, and alternates between the first and second levels at a duty ratio during the stand-by state. Drive circuit means transfer current to the image sensor in response to the control signal. Therefore, current is continuously transferred to the image sensor during the read state, no current is transferred during the rest state, and current is intermittently transferred to the image sensor at the duty ratio during the stand-by state.

29 Claims, 30 Drawing Sheets

CURRENT FEED BACK

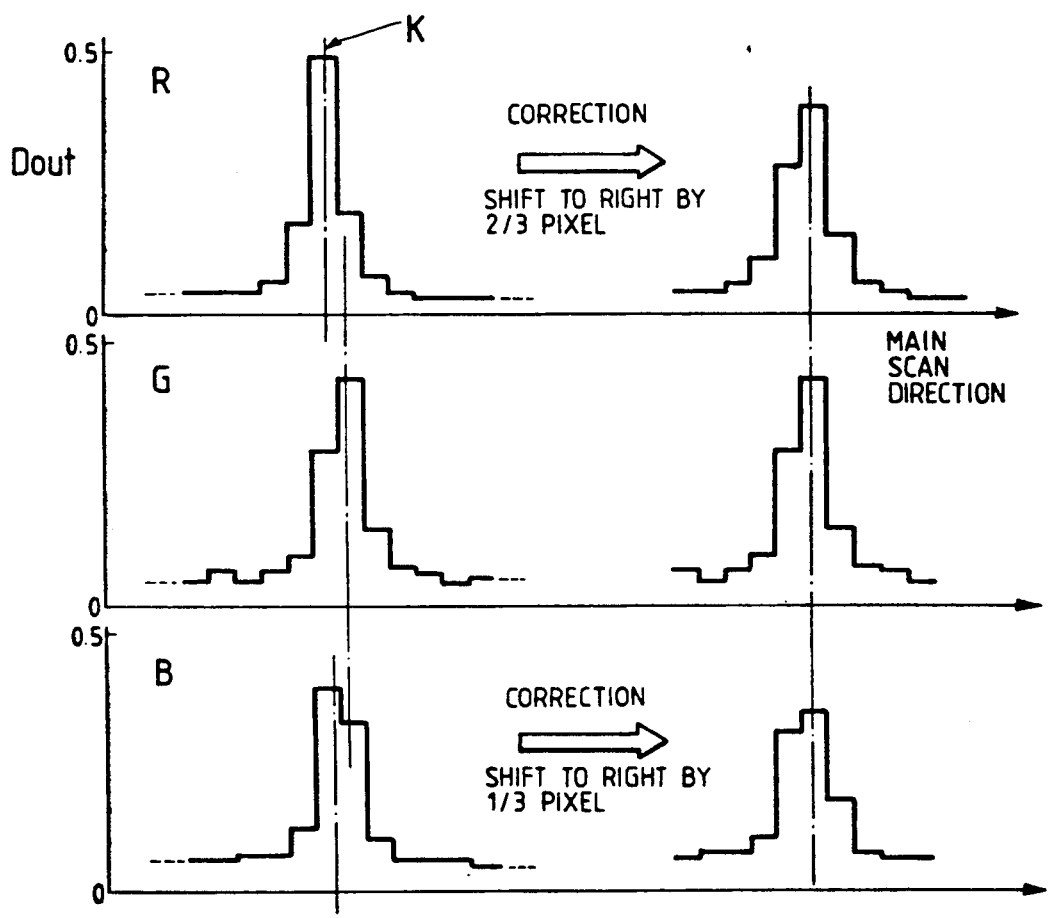

INCREASE OF
SENSOR OUTPUT

▲ : 35°C
○ : 25°C
□ : 5°C

IMAGING READING APPARATUS HAVING A PREHEATING SYSTEM

BACKGROUND OF THE INVENTION

1. Field of the Invention

The present invention relates to an image reading apparatus for use with an image recording apparatus, such as a copying machine, a facsimile, or a printer, and more particularly to a preheating system for the image reader.

2. Description of the Prior Art

In an apparatus for converting image information on an original into electrical signals, such as a facsimile, a printer, an image data storage apparatus, or a copying machine, a charge-coupled device (CCD) line sensor has been predominantly used as an image reading apparatus.

There are two known types of CCD line sensors. In the first type of CCD line sensor, a plurality of CCD "short line" sensors are arrayed linearly or in a zig-zag fashion, forming a CCD "long line" sensor to read an image of a large original. In reading the image, the CCD image sensor comes into close contact with the original and slides over the original. In the second type of CCD line sensor, a reduction optical system reduces a projected image of the original, and focuses the reduced image onto a small CCD line sensor.

In conventional use, after the power is turned on, the CCD line sensor is continuously supplied with electric power, and placed in a driven state. The only control applied to the CCD line sensor is for outputting the image data as read.

The continuous power supply and the constantly driven state stabilize the CCD line sensor. The resultant image data suffers from little variation in optical density and, hence, is stable. However, when the CCD line sensor is continuously supplied with electric power and is ceaselessly driven, it is heated to a high temperature. If adequate cooling by a heat sink is not provided, the lifetime of the sensor is unavoidably reduced. In this respect, the reliability of a typical CCD line sensor is poor.

In addition, the continuous power supply unnecessarily consumes electric power.

To save electric power and prevent excessive temperature rise, the generation of a drive clock signal for image formation may be stopped while image reading is not taking place. That period of time is referred to as non-read time.

In one such proposal found in Japanese Patent Unexamined Publication No. 63-196158 for stopping the drive clock signal generation during the non-read time, reading of image data may be inconsistent. More specifically, when the non-read time is extensive, the image sensor will cool down. If the read operation starts while the image sensor is cool, an image is read and printed cut by a machine whose characteristics are still unstable. Particularly in successive printing, the printed copies from one original image may have different optical densities. In this respect, the reliability is also unsatisfactory.

SUMMARY OF THE INVENTION

An object of the present invention is to provide an image reading apparatus with stable characteristics, without reducing the lifetime of the CCD line sensor.

A further object of the present invention is to provide a new preheating arrangement for an image sensor.

To achieve the above objective, there is provided an image reading arrangement with an image senor operable in a read state and a stand-by state. Drive circuit means transfer current to the image sensor in response to a control signal which is generated by a control signal generating means. The control signal has a constant preset level during the read state, and alternate first and second levels alternating at a duty ratio during the stand-by state. Therefore, current is continuously transferred to the image sensor during the read state and current is intermittently transferred to the image sensor at the duty ratio during the stand-by state.

Preheating occurs during the standby state. The current supplied to the CCD line sensor heats the CCD line sensor. However, because the current is only intermittent and not constant, the CCD line sensor will not be kept at a high temperature reducing the lifetime. The temperature of the CCD line senor is kept high enough to insure a stable read characteristic if image reading is suddenly started again after a long non-read time.

The duty ratio may be altered as other factors change. For example, a lower duty ratio may be used if the room temperature increases, or a lower duty ratio may be used if the image reader is operated for a long period of time.

In a second embodiment of the invention, a heater is provided near the CCD line sensor. The heater is supplied with an intermittent current during the stand-by state to preheat the CCD line sensor.

BRIEF DESCRIPTION OF THE DRAWINGS

Other advantages and features of the present invention will be apparent from the following description taken in connection with the accompanying drawings, which are incorporated in and form a part of the specification, illustrate the invention and, together with the description, serve to explain the principles of the invention.

FIG. 25(a) and 25(b) are a graph showing the correction of color displacement for in the coping machine shown in FIG. 2;

DETAILED DESCRIPTION OF THE INVENTION

Figure 1A:
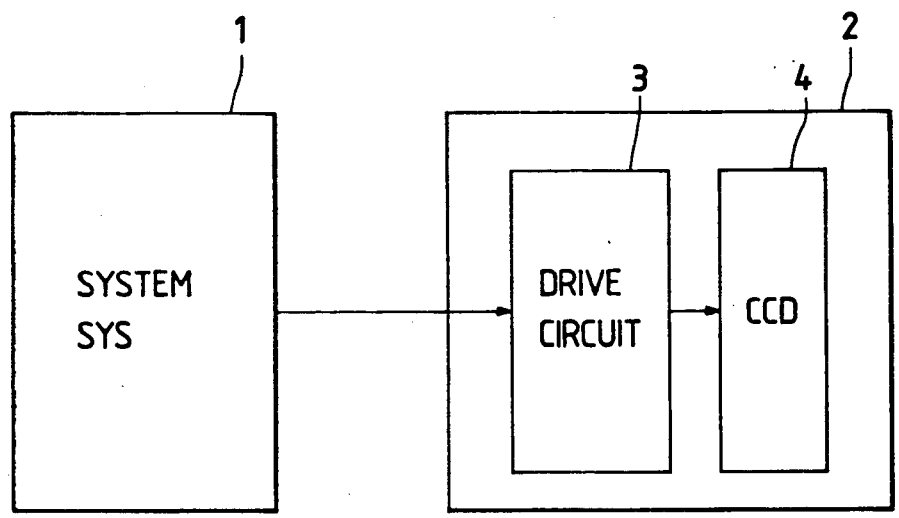
FIGS. 1(a) and 1(b) show a configuration of an image reading apparatus and a timing chart according to an embodiment of the present invention.
Figure 1B:
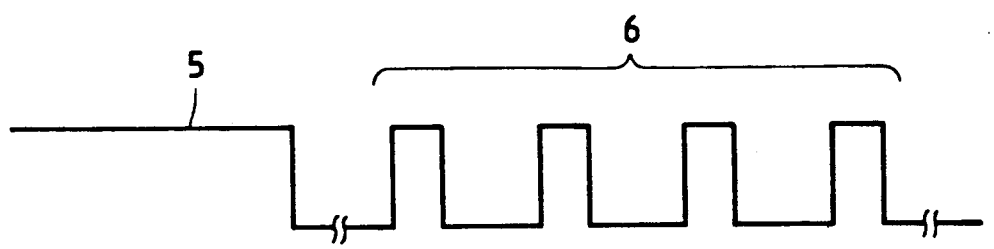

The image reading apparatus is shown in FIG. 1(a). A system (SYS) 1 controls the overall operation of the machine. SYS 1 transfers control signals to start and end an image read operation to a drive circuit 3. Drive circuit 3 drives a CCD line sensor 4 of an image reading apparatus 2. Under control of the control signals, the image reading apparatus 2 performs predetermined operations. To be more specific, the control signal transferred from SYS 1 to drive circuit 3 is an on/off signal as shown in FIG. 1(b). During a read period 5, a duty ratio of the control signal is 100%, while during a non-read period 6, the control signal is interrupted at a preset duty ratio. Therefore, during the read period 5, electric power is continuously supplied to CCD line sensor 4, while during non-read period 6, the power is intermittently supplied to CCD line sensor 4 at the preset duty ratio.

With such an arrangement, CCD line sensor 4 is operable at a relatively low temperature and with stable read characteristics. Even when image reading is suddenly started again after a long non-read time, the image reading can be stably carried out with little variation of the optical densities. It is further noted that during the non-read period, the sensor is kept at a relatively low temperature. This feature ensures an increased lifetime of the CCD line sensor and a reliable CCD line sensor.

The present invention will be described in greater detail by using specific embodiments.

In the description to follow, a color copying machine will be used as an example of the image recording apparatus. It should be understood, however, that the present invention is not limited to the color copying machine, but may be applied to other types of image recording apparatuses, such as a printer or a facsimile.

The embodiment description in this specification is divided into the following sections and subsections. Section I broadly describes a color copying machine incorporating the present invention. Section II describes, in detail, the embodiments of the present invention which are realized in the color copying machine.

The sections of the detailed description are listed below.

(I) SYSTEM DESCRIPTION (I-1) System Configuration
(I-2) Functions and Features
(I-3) Electrical Control System
(I-4) Image Processing System (IPS)
(I-5) Image Output Terminal (IOT)
(I-6) User Interface (U/I)
(I-7) Film Image Reader

(II) IMAGE INPUT TERMINAL (IIT)

(II-1) Imaging Unit Drive Mechanism
(II-2) Control system for a Stepping Motor
(II-3) Imaging Unit
(II-4) Video Signal Processing Circuit
(II-5) Control System for IIT (including CCD preheating)

(I) SYSTEM DESCRIPTION

(I-1) System Configuration

Figure 2:
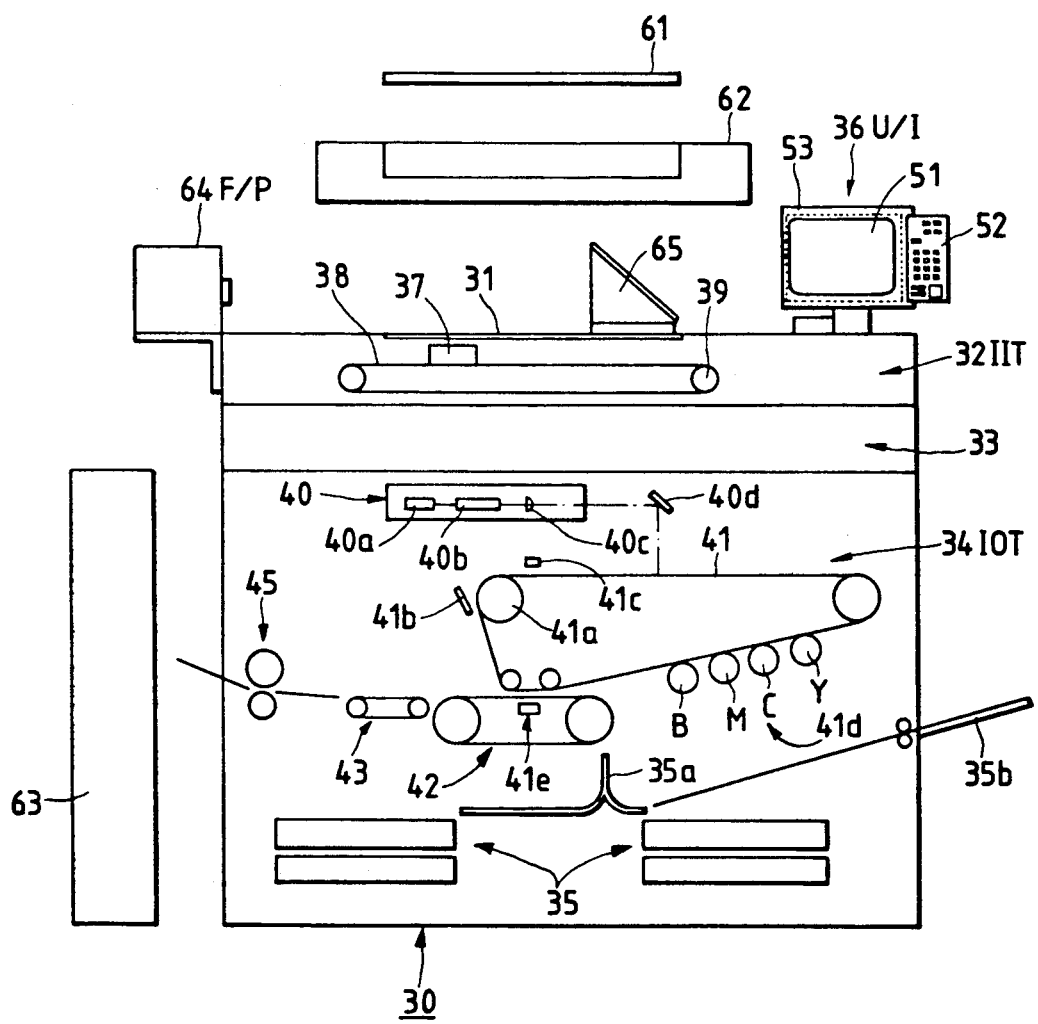
FIG. 2 is a longitudinal sectional view showing an overall structure of a color copying machine incorporating the present invention.

FIG. 2 shows a color copying machine into which the present invention is incorporated.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

Electrical hardware is required for controlling the image input terminal (IIT) 32, image output terminal (IOT) 34, user interface (U/I) 36, etc. The electrical hardware is divided into a plurality of circuit sections with different signal/data processing functions, such as image input terminal (IIT) 32, an image processing section (IPS) for processing the output image signals of the image input terminal (IIT) 32, user interface (U/I) 36, and film projector (F/P) 64. These circuit sections are assembled into circuit boards, respectively. Together with an SYS board for controlling the above circuit boards, and an MCB (master control board) for controlling the image output terminal (IOT) 34, auto document feeder (ADF) 62, sorter, etc., these circuit boards are housed in the electrical control housing 33.

A mirror unit (M/U) 65 is installed. In this instance, it is placed on the platen glass 31. In association with this, the film projector (F/P) 64 is installed. A color image of a color film, for example, that is projected by the film projector (F/P) 64, is read by the imaging unit 37 of the image input terminal (IIT) 32. With the combination of the mirror unit (M/U) 65 and film projector (F/P) 64, the images of a color film can be copied directly from the color film. The object to be imaged may contain negative and positive films, and slides. Additionally, an auto focusing device and a correction-filter auto exchanging device are installed in the copying machine 30.

(I-2) Functions and Features

A high quality full color copy providing a clear and distinctive color image of a color document is attained, with improvements in black image reproduction, light color reproduction, generation copy quality, OHP image quality, thin line reproduction, image quality reproduction of film copies, and copied image sustaining.

The color copying machine is operable as a mono color copying machine. The copying speed for mono color copies is increased about three times over that of conventional copying machines, and is 30 copies/A4.

Input/output devices such as an ADF and a sorter are optionally available, and, hence, a large number of documents can be copied. A magnification may be set in a broad range of 50% to 400%. A maximum size of document that can be copied is A3. Three stages of paper trays are used, the upper tray accommodating B5 to B4 size, the medium tray accommodating B5 to B4, and the lower tray accommodating B5 to A3 and SSIB5 to A3. The copy speed for the full color (4-pass color) copy is 4.5CPM for A4, 4.8CPM for B4, and 2.4CPM for A3. The copy speed for the mono color copy is 19.2CPM for A4, 19.2CPM for B4, and 9.6CPM for A3. A warmup time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operations. Effective use of colors correctly sends necessary information to operators. A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. Such soft panel operations would smoothly be accepted by users accustomed to the mono color copying machine. To access the various edit functions, a pathway is opened by merely touching a pathway tab in a pathway area on the soft panel, and an operator may readily access the edit modes. Storage of copy modes and conditions for exercising them in a memory card realizes an automation of relation manual operations.

A CRT display is used for the user interface. The CRT display displays functions and execution conditions, and other information in the form of a menu. Any user, including beginners and professionals, has easy access to the copying machine with the aid of the menus on the display. The copying machine has a variety of functions satisfying a variety of user's needs. The procedural steps ranging from the start to the end of a copying operation are almost completely automated.

Manual operations on a hard control panel are used for control items cannot be defined by operation flows, such as start, stop, all clear, ten keys, interrupt, information, and language select. A variety of control functions can be used by touching soft buttons on a basic display. Further, any of various editing functions, such as a maker edit, business edit, and creative edit, can be selected by opening a pathway by touching a pathway tab corresponding to a pathway as a function select region. The area specified when the editing functions are used is displayed in the form of bit map area, providing a visual confirmation of the specified area. With such various editing functions and color creation, a smart expression by sentences is secured.

The high performance color copying machine of the full color (4-pass color) is operable at 1.5 kVA. A control system realizing the 1.5 kVA specification in the respective operation modes is used. A power distribution to the circuit systems for different functions is also used. An energy transmission system table for confirming energy transmission systems is prepared. The management and verification of power consumption are carried out by using the energy transmission system table.

(I-3) Electrical Control System

This section will handle hardware architecture, software architecture and state division in an electrical control system of the color copying machine according to the present invention.

Figure 3:
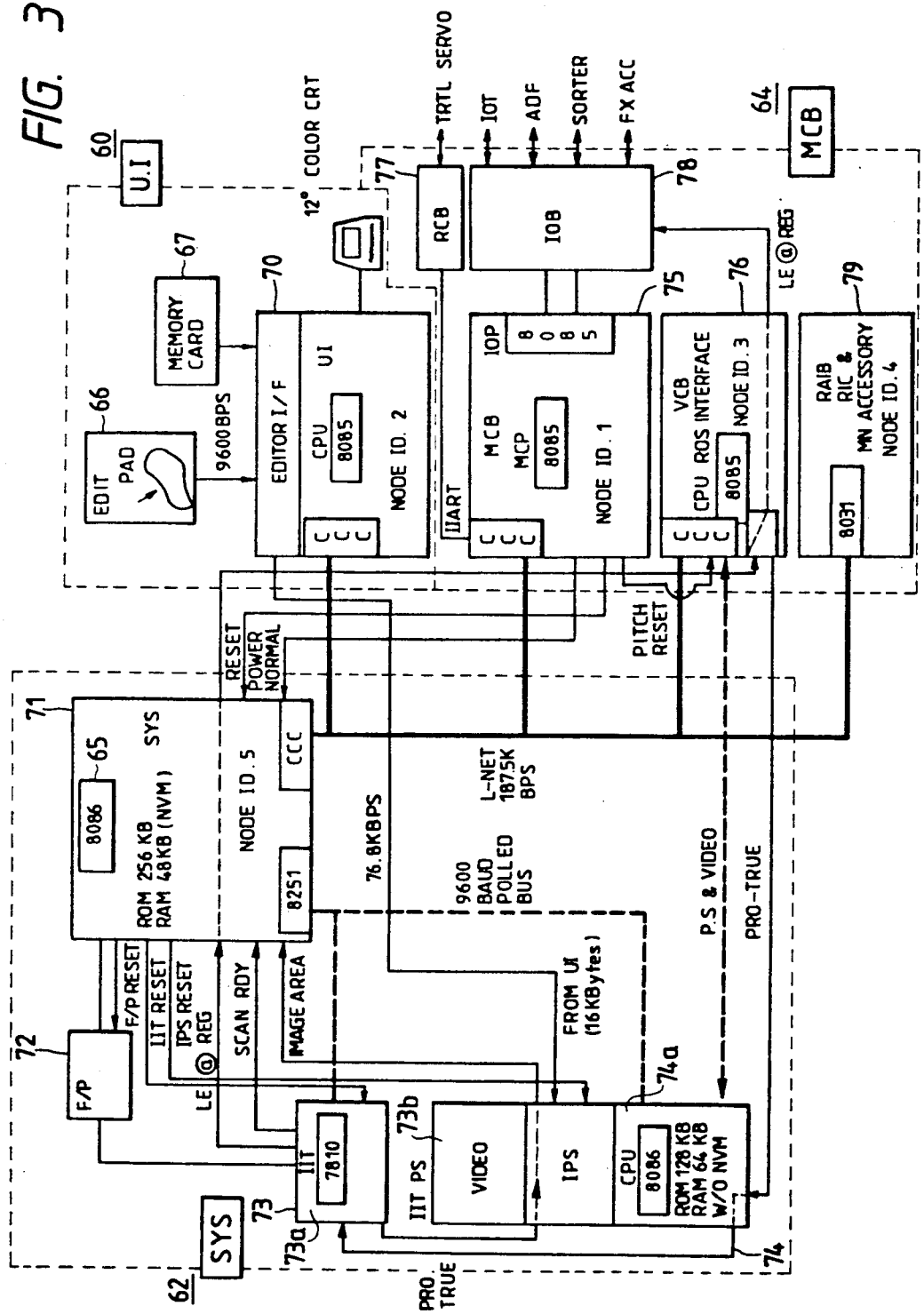
FIG. 3 shows a hardware arrangement for the coping machine shown in FIG. 2.
Figure 4:
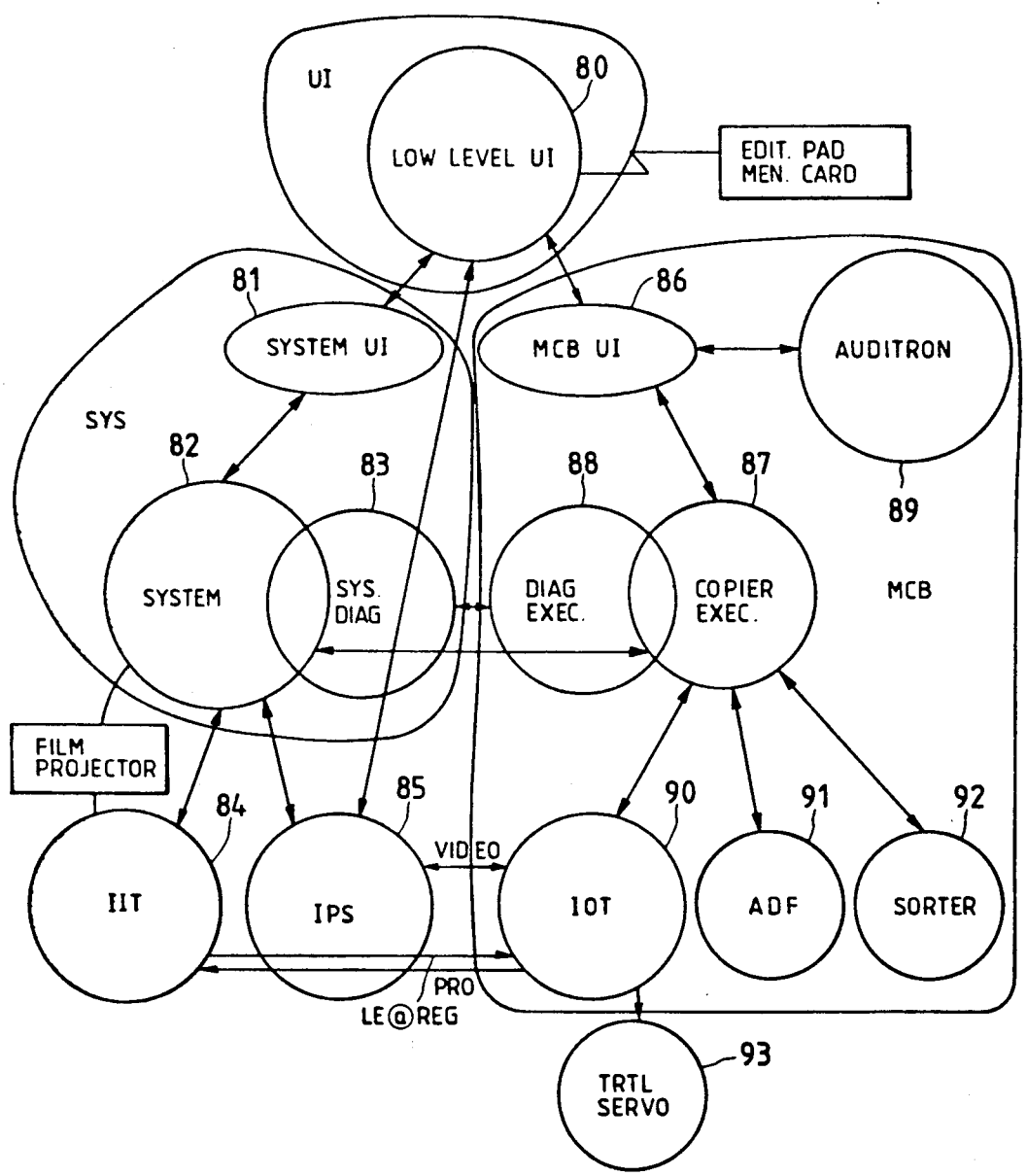
FIG. 4 shows a software architecture for the coping machine shown in FIG. 2.

FIG. 3 shows the hardware architecture employed in the copying machine under discussion. FIG. 4 shows the software architecture.

When a color CRT is used as an U/I as in the present color copying machine, the amount of data for color display is greater than when a monochromatic display is used. Attempts to build a friendlier UI by contriving a display layout on the display and display transitions also bring about an increase of the amount of necessary data.

Use of a CPU with a large memory would be possible, if required, but a large memory requires a large board. The large board creates additional problems. It is difficult to house in the base machine. The large board also makes it difficult to alter the design of the copying machine. Further, it increases the cost of manufacture.

To cope with the increase of data, in the present color copying machine, the data processing units (CPUs) are decentralized in such a way that the operations, such as CRT control, that can be used in common with other models or machines, are treated in the form of remotes.

Hardware in the electrical system, as shown in FIG. 3, is categorized into three systems, a UI system 60, SYS system 62 and MCB system 64. The UI system 60 contains a UI remote 70 alone. In the SYS system 62, an F/P remote 72 for controlling the F/P, IIT remote 73 for reading an image of an original, and an IPS remote 74 for executing various image processings are operated in a decentralized manner under a synthetic control of an SYS (system) remote 71. The IIT remote 73 includes an IIT controller 73a for controlling the imaging unit, and a VIDEO circuit 73b for digitizing a read image signal and transferring the digitized image signal to the IPS remote 74. The IIT remote 73, and the IPS remote 74 are controlled by a VCPU 74a. The SYS (system) remote 71 is provided for synthetically controlling the respective remotes as mentioned above and discussed later. The SYS remote 71 requires a large memory capacity, because a program for controlling the display transitions of the UI 60, and others must be stored. An 8086 processor 65 containing a 16-bit microprocessor is used for the SYS remote 71. If required, an 68000 may be used.

The MCB system 64 is composed of a video control board (VCB) remote 76, RCB remote 77, IOB remote 78, and an master control board (MCB) remote 75. The VCB remote 76, serving as a raster output scan (ROS) interface, receives from the IPS remote 74 a video signal to form a latent image on the photosensitive belt by a laser beam, and sends the video signal to the IOT. The RCB remote 77 controls a servo system of the transfer belt (turtle). The IOB remote 78 serves as an I/0 port for the IOT, ADF, sorter, and accessories. The MCB (master control board) remote 75 synthetically controls those remotes.

Each remote in the drawing of FIG. 3 is mounted on a single board. In the figure, a bold continuous line indicates a high speed communication network LNET of 187.5 kbps; a bold broken line, a master/slave serial communication network of 9600 bps; and thin continuous lines, hot lines as transmission lines for control signals. A line 76.8 kbps indicates a line exclusively used for transmitting graphic information as depicted on an edit pad 66, copy mode data entered from a memory card 67, and graphic data in the edit area from the UI remote 70 to the IPS remote 74. CCC (communication control chip) indicates an IC for supporting a protocol for the high speed communication line LNET.

As described above, the hardware arrangement is composed of the UI system 60, SYS system 62, and MCB system 64. The processes shared by those systems will be described with reference to the software architecture of FIG. 4. Arrows indicate the directions of data transmission through the high speed communication network LNET of 187.5 kbps and the master/slave serial communication network of 9600 bps, and the direction of control signals flowing through the hot lines.

The UI remote unit 70 is made up of a low level user interface (LLUI) module 80 and a module (not shown) for the processing of the edit pad and the memory card. The LLUI module 80, that is similar to a so-called CRT controller, is a software module for displaying an image on a color CRT display. Images to be displayed and how to display them are determined and controlled by an SYSUI module 81 and an MCBUIT module 86. As seen from the above, the UI remote unit can be used in common with other models and apparatus. The reason for this is that how to lay out the display screen and how to change the display are determined by the apparatus used, but the CRT controller is used in combination with the CRT.

The SYS remote unit 71 is made up of three modules, SYSUI module 81, SYSTEM module 82, and SYS.-DIAG module 83.

The SYSUI module 81 is a software module for controlling the display change or transition. The SYSTEM module 82 contains a software for recognizing coordinates as selected on the software panel and a display presenting the selected coordinates, viz., feature function (F/F) select software recognizing a job as selected, a job check software to finally check as to if there is a contradiction in the conditions for copy job execution, and a software for controlling the transfer of various types of data, such as F/F select, job recovery, and machine states, with other modules.

The SYS.DIAG module 83 operates in a customer simulation mode in which the copying operation is done in a diagnostic state for self-test. In the customer simulation mode, the color copying machine under discussion operates as it operates in a normal copying operation mode. Accordingly, the SYS.DIAG module 83 is substantially the same as the SYS.DIAG module 82, but it is used in a special state, or the diagnostic state. For this reason, the SYS.DIAG module 83 and the SYSTEM module 82 are separated, but partially overlap in the drawing.

An IIT module 84 for controlling a stepping motor used in the imaging unit is contained in the IIT remote unit 73. An IPS module 85 for executing various processings is contained in the IPS remote unit 74. These modules are controlled by the SYSTEM module 82.

The MCB remote unit 75 contains software modules, such as an MCBUI module 86 as a software for controlling display changes in the diagnostic mode, auditron mode, and fault state such as jamming, an image output terminal (IOT) module 90 for executing the processings necessary for the copying operation, such as photosensitive belt control, developing unit control, and fuser control, an ADF module 91 for controlling the ADF, a SORTER module 92 for controlling a sorter, a copier executive module 87 for managing the above software modules, a dia. executive module 88 for executing various diagnoses, and an auditron module 89 for charge calculation that is made by accessing an electronic counter with a password.

The RCB remote unit 77 contains a turtle servo module 93 for controlling an operation of the turtle. The module 93 is under control of the IOT module 90, in order to control the transfer process in the Xerography cycle. In drawing, the copier executive module 87 and the dia. executive module 88 ar depicted partially overlapping with each other. The reason for this is the same as that for the partial overlapping of the SYSTEM module 82 with the SYS.DIAG module 83.

Figure 5:
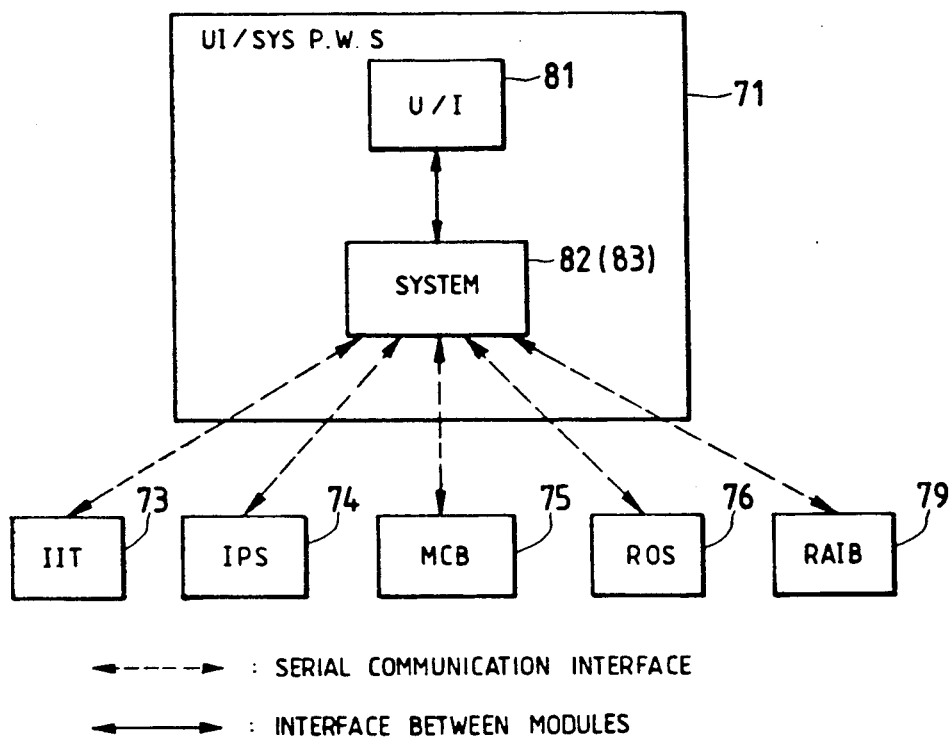
FIG. 5 is a diagram showing the relationships of the system and remote units for the coping machine shown in FIG. 2.

FIG. 5 shows relationships between the system remote unit 71 and other remote units.

As described, the SYS remote unit 71 uses the SYSUI module 81 and the SYSTEM module 82. Data is transferred between these modules 81 and 82 through a module interface. A serial communication interface interposed between the SYSTEM module 82, and the IIT 73 and IPS 74. An LNET communication network couples the SYSTEM module 82 with the MCB 75, ROS 76 and RAIB 79.

A module configuration of the system will be described.

Figure 6:
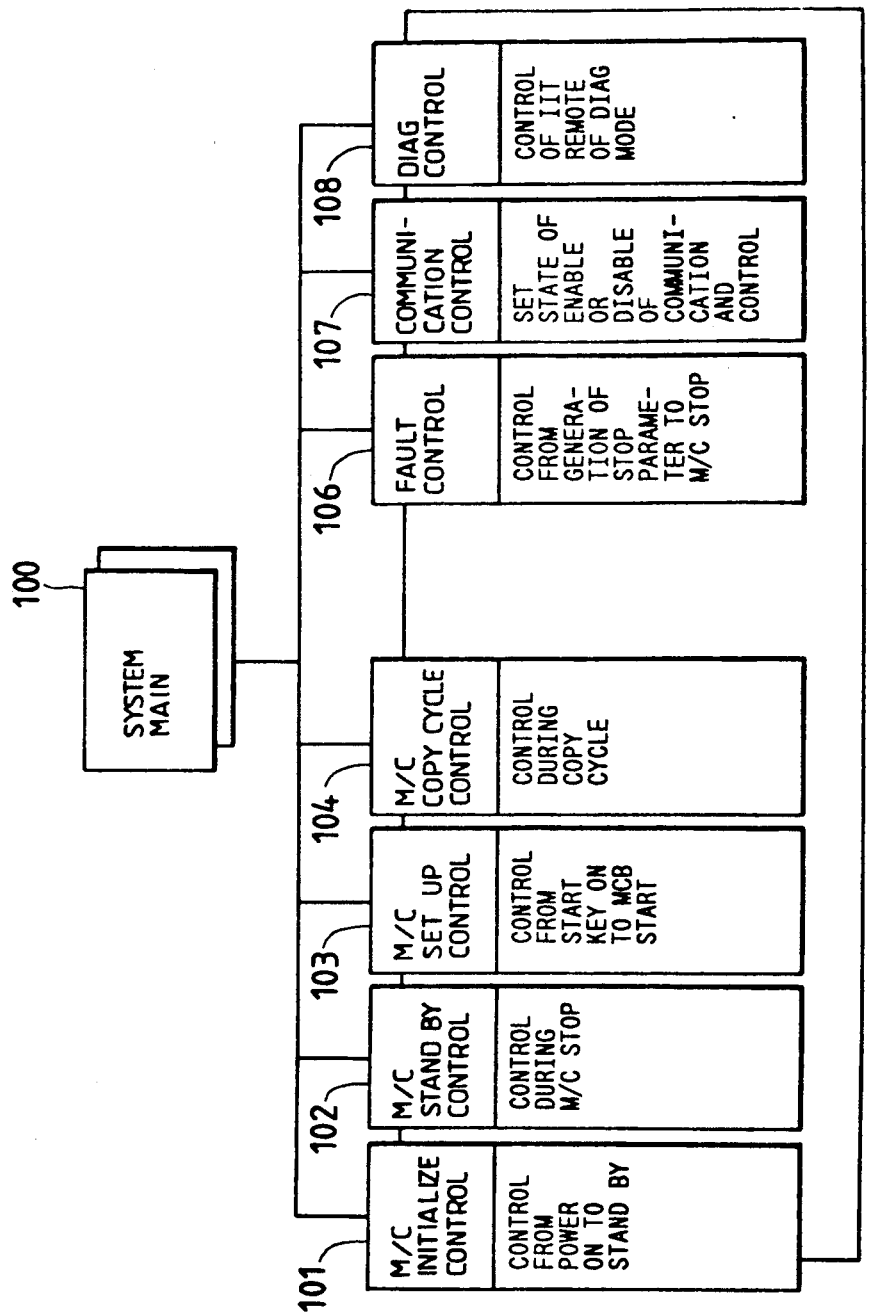
FIG. 6 is a diagram showing a module configuration of the system for the-coping machine shown in FIG. 2.

FIG. 6 shows a module configuration of the system.

In the color copying machine of the present invention, the modules such as IIT, IPS and IOT function like passive parts, and the modules in the system for controlling the above modules function like active parts with intellect. The copying machine employs a decentralized CPU system. The per original layer and the job programming layer are shared by the system. The system has the control right to control the initialize state, stand-by state, set-up state, and cycle state, and the UI master right for using the UI in the above states. Accordingly, the modules corresponding to them make up the system.

A system main 100 fetches the data received from the SYSUI, MCB, and the like into the internal buffer, clears the data in the internal buffer, calls the respective lower order modules in the system main 100 and transfers the job to them, thereby to execute the updating processings.

An M/C initialize control module 101 controls an initialize sequence from the power-on to the setting up of the stand-by mode. This is driven following the power-on state for executing various types of tests after the power-on by the MCB.

An M/C set-up control module 103 controls a set-up sequence from the pushing of the start key till the MCB for executing the copy layer is driven. Specifically, it forms job modes using FEATURE (directions given to the M/C in order to satisfy the requests by a user) that is specified by the SYSUI, and determines a set-up sequence in accordance with the job modes.

An M/C stand-by control module 102 controls a sequence during the M/C stand-by state, more exactly executes accept of the start key, control of color registration, and entry of the diagnosis mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS.

Additionally, the module 104 sends a through command that is generated during the M/C stop or the M/C operation, to a called remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A communication control module 107 sets the IIT ready signal from the IIT, and sets an enable or disable of the communication in the image area.

A diagnosis control module 108 executes the controls in the input check mode and the output check mode that are contained in the diagnosis mode.

(II-2) Image Processing System (IPS)

Figure 7:
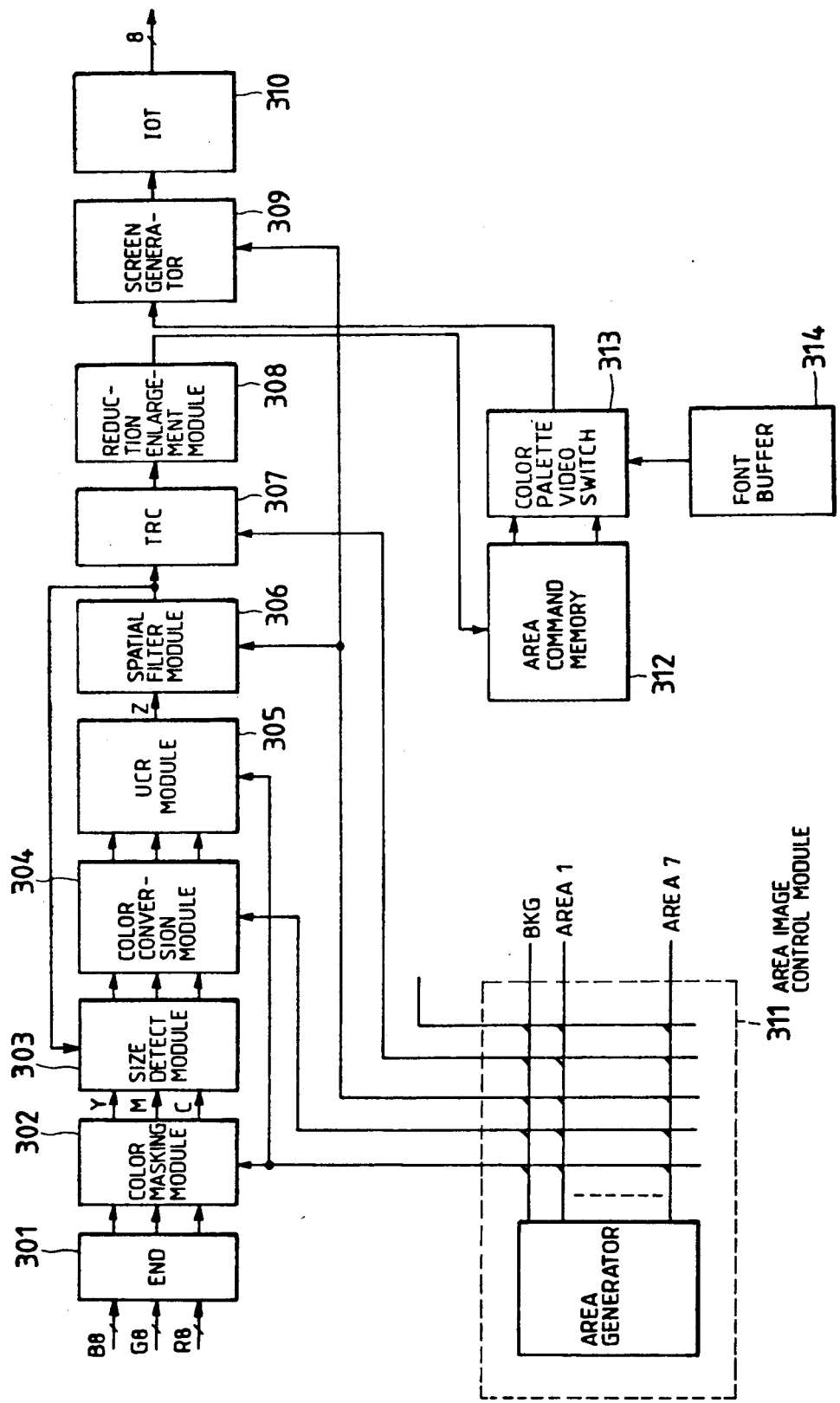
FIG. 7 shows a hardware configuration of the image processing section (IPS) for the coping machine shown in FIG. 2.

FIG. 7 shows an arrangement of IPS modules in the image processing system (IPS).

The IPS receives color separated signals of B, G and R from the image input terminal (IIT), and converts these separated signals into toner primary colors of Y (yellow), M (magenta), C (cyan), and K (black or fuchsia). Then, it selects a toner signal X of process color, digitizes it into an on/off data of the toner signal of process color, and outputs it to the image output terminal (IOT) 310. During the above processing, the IPS executes the data processings for improving the reproducibility of colors, tone, and definition.

The equivalent neutral density (END) conversion module 301 adjust (converts) the optically read signal of the color original obtained by the IIT into a gray balanced color signal. The module END 301 contains conversion tables of 16 planes, which, when a gray original is read, converts a read signal into color separated signals of B, G and R in accordance with a level (black→white) of the read signal.

The color masking module 302 converts the B, G and R color separated signals into tone signals of Y, M and C. For the conversion, a matrix operation or a table is used.

An original size detect module 303 detects the size of an original in a prescan mode, and suppresses the platen color (edge suppress) in an original read mode. When the original is slantedly placed or it is not rectangular in shape, the maximum and minimum values (x1, x2, y1, y2) of the horizontal and vertical sizes of the original are detected and stored.

A color change module 305 executes a color change processing in a specific area on an original in accordance with a specified color. In accordance with an area signal applied from an area module control module, the module 305 produces the color signals of Y, M, and C of the original as intact, when the present area on the original is not a color change area. When it is in the color change area, the color change module 305 detects a specified color, and produces Y, M, and C signals of the change color.

A UCR (under color removal) /black generation module 305 generates a proper amount of K to prevent a color impurity, and equally reduces the toner colors Y, M and C in accordance with the amount of the generated K (this process is called an under color removal (UCR)). Through the processing, the UCR/back generation module 305 prevents the mixing of fuchsia into the pure color and the hue degradation of a low gradation, high hue color.

A spatial filter module 306 generates mesh point removal data and edge emphasis data by a digital filter and a modulation table. For an original of photograph and mesh point printing, the module 306 applies a smoothing process. For an original of characters and line graphic, the module applies an edge emphasis process.

The IOT executes a copy cycle four times (in the four full color copy) with the process colors of Y, M, C, and K in accordance with an on/off signal from the IPS, thereby to reproduce a full color original. To faithfully reproduce colors as theoretically obtained through a signal processing, fine adjustment is required allowing for the characteristics of the IOT.

A tone reproduction control (TOC) conversion module 307 is used for improve the color reproduction. The module 307 has the following various functions: density adjustment in accordance with an area signal, contrast adjustment, nega./posi. (negative/ positive) inversion, color balance adjustment, character mode, and transparent composition.

A reduction/enlargement module 308 exercises the reduction/ enlargement processing in the main scan direction in a manner that when data is read and written by a line buffer, a thin-out interpolation and an additive interpolation are appropriately applied. A shift image processing in the main scan direction is also possible by reading data out of the line buffer at an advanced or delayed timings. Further, a repeat processing is possible by repeating the read operation. A mirror image processing is also possible when the data is read out of the line buffer in the reverse direction. In the vertical scan direction, the scan speed is varied in the range from 2 times to ¼ time, to vary the magnification from 50% to 400%.

A screen generator 309 converts a gradation toner signal of each process color into an on/off or binary toner signal. In the screen generator, the digitizing processing and the error diffusion processing are conducted by comparing a threshold matrix with the graduated data. The IOT receives the binary toner signal, and turns on and off a laser beam to reproduce a halftone image. In this case, the laser beam is elliptically shaped in cross section with its geometry of about 80 um d long and about 60 um ^d wide. These figures are selected so as to satisfy the recording density of 16 dots/mm. The screen generator 309 detects quantization errors of the on/off or binary signal as generated by the generator and the input gradation signal, feeds them back, effecting the error diffusion processing. The error diffusion processing improves the reproduction of gradation as macroscopically viewed.

In the area image control module 311, seven rectangular areas and a priority order of them can be set. Control data relating to the respective areas can be set. The control data includes data of color change and a color mode indicative of mono color or full color, modulation select data of photo graph, characters, and the like, select data of TRC, select data of the screen generator, and the like. The control data is used for controlling the color masking module 302, color conversion module 304, UCR module 305, spatial filter 306, and the TRC module 307.

An edit control module executes an outline-drawing processing in which an original bearing a circular figure, such as a circular graph, not a rectangular figure is read, and a specified area w-hose configuration is indefinite is painted with specified color. Commands 0 to 15 are used for fill pattern, fill logic, log processing, and the like.

As seen from the foregoing description, in the IPS, the read signals from the IIT are subjected to the END conversion, and the color masking process. The read signals are further subjected to the edge suppress and the color change, and the under color removal process. A fuchsia color is generated. Then, the read signals are converted into the process colors. In the case of the processings, such as spatial filter, color modulation, TRC, and reduction/enlargement, it is better to use the process colors data rather than to use the full color data, because the amount of processed data is small, and hence the number of the used conversion tables may be reduced to ¼. Accordingly, more varieties of the conversion tables may be used, thereby to improve the reproducibility of colors, gradation, and definition.

(II-3) Image Output Terminal (IOT)

(A) Outline

Figure 8:
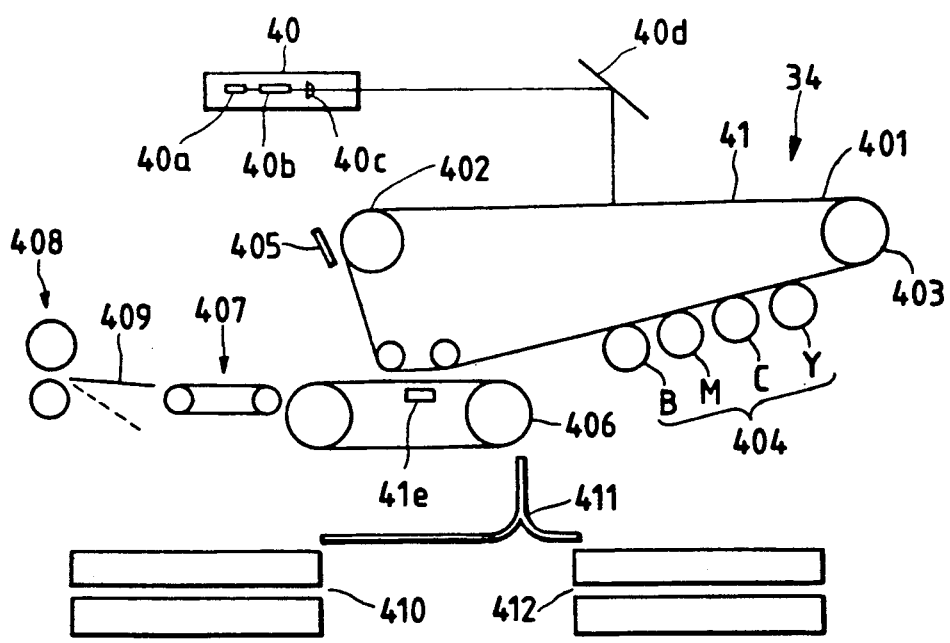
FIG. 8 shows a hardware configuration of the image output terminal (IOT) for the coping machine shown in FIG. 2.

A scheme of the image output terminal (IOT) is shown in FIG. 8.

The IOT uses a photo receptor belt as a photo sensitive member. The IOT is provided with a developing unit 404 consisting of four developing devices of the full color, i.e., black (K), magenta (M), cyan (C) and yellow (Y), a tow roll transfer loop 406 for transferring paper to the transfer unit, a vacuum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the IOT to the front side.

The data light obtained by modulating a laser beam from a laser source 40 is guided through a mirror 40d onto the surface of the photo receptor belt 41, thereby forming a latent image thereon. The latent image formed on the surface of the tow roll transfer loop or turtle 41 is developed into a toner image by the developing unit 404. The developing unit 404 consists of four developing devices of K, M, C and Y which are disposed as shown. The layout of the developing devices is determined allowing for a relationship between a dark attenuation and the characteristics of the respective toners, difference in the results of mixing of the respective color toners with the black toner, and the like. In the case of the full color copy, these developing devices are driven in the order of Y→C→M→K.

Papers fed from the two-stage elevator tray 410 and another two-stage tray 412 are supplied through the transfer path 411 to the transfer tow roll transfer loop 406. The loop 406 is disposed in the location of the transfer unit, and is made up of a pair of rolls rotatably coupled by a timing chain or a timing belt, and a gripper bar to be given later. The paper is gripped and transferred by using the gripper bar, and the toner image on the surface of the photo receptor belt is transferred onto the paper. In the case of the 4-color full color, the paper is turned four times by the tow roll transfer belt, during the four turns, the toner images of Y, C, M and K are transferred onto the paper in this order. After the image transfer, the paper is released from the gripper bar, and transferred to the vacuum transfer 407, and fed to the fuser 408. The toner image on the paper is fused by the fuser and delivered outside the base machine.

The vacuum transfer 407 absorbs the difference of the speeds of the transfer loop 406 and the fuser 408, thereby synchronize them in operation. In this instance, the transfer speed (process speed) is 190 mm/sec. In the case of the full color copy, a fusing speed is 90 mm/sec. Thus the transfer speed is different from the fusing speed. To secure the fusing speed, the process speed is reduced. Since the 1.5 kVA power must be secured, excessive power cannot be distributed to the fuser.

To cope with this, in the small paper such as B5 and A4 papers, at the instant that the image transferred paper is released from the transfer loop 406 and rides on the vacuum transfer 407, the speed of the vacuum transfer 407 is decreased from 190 mm/sec to 90 mm/sec, thereby to make it equal to the fusing speed. The instant copier is designed to be compact by making the distance between the transfer loop and the fuser as short as possible. The A3 paper is in excess of the distance of the transfer point and the fuser. If the speed of the vacuum transfer is decreased, there inevitably occurs a situation that the leading end of the paper reaches the fuser, but the trailing end portion of the paper is under image transfer process. In such a situation, the paper is braked and consequently a color displacement possibly occurs. To solve this problem, a baffle plate 409 is provided between the fuser and the vacuum transfer. When the A3 paper arrives, the baffle plate is turned down to curve the A3 paper along the plate, thereby to apparently elongate the path between the fuser and the vacuum transfer. Accordingly, the vacuum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for the A3 paper is correspondingly applied to the OHP, because it has a poor thermal conduction.

The instant copier is designed that a black copy as well as the full color copy can be made at a high efficiency. In the case of the black copy, the toner layer is thin and hence it can be fused by a less amount of heat. Accordingly, the fusing speed is 190 mm/sec, viz., without speed down in the vacuum transfer. The same thing is applied to a single color copy, because the single color copy has a single toner layer. After the transfer process is completed, the toner left on the surface of the photo receptor belt is wiped out by a cleaner 405.

(II-4) User Interface (U/I)

The U/I is provided with a monitor of a 12-inch color display 51 and a hard control panel 52 adjacent to the monitor. A creative color display provides menus legible to users. Further, an infrared ray touch board 53 is disposed on the fringe of the color display 51. Use of the touch board allows a user to directly access to the machine by soft buttons to be displayed in the display screen of the display 51. Various types of operations are properly assigned to the hard buttons on the hard control panel 52 and the soft buttons in the screen of the display 51, thereby providing simple operations and effective use of menu displays.

Figure 9:
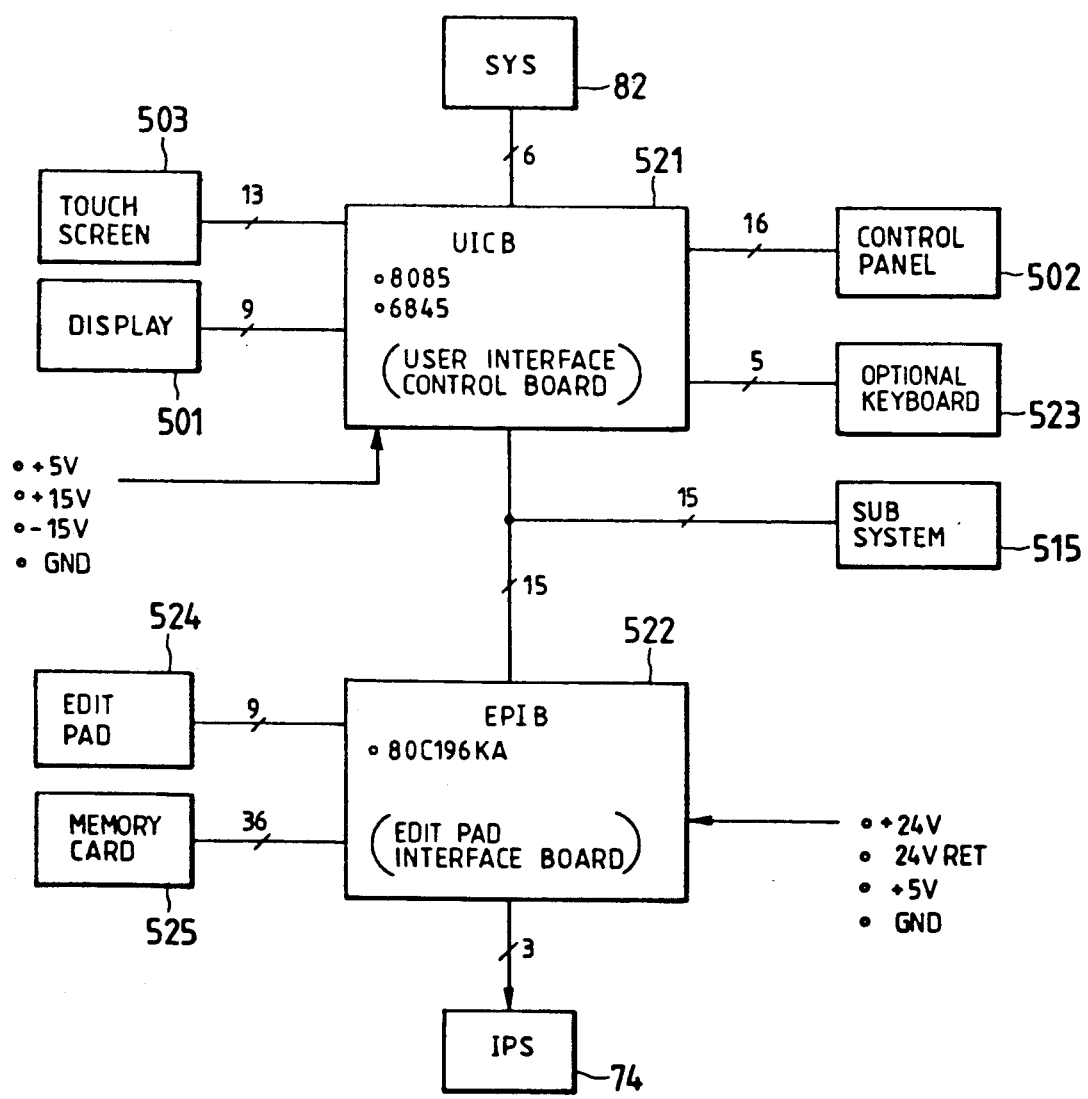
FIG. 9 shows a hardware configuration of the user interface (UI) for the coping machine shown in FIG. 2.

The hardware of the user interface according to the instant invention is made up of a couple of control boards, UICB 521 and EPIB522, as shown in FIG. 9. In connection with the above module configuration, the functions of the user interface are also categorized into two groups. The UICB 521 uses two CPUs, such as 8085 and 6845 or their equivalents by Intel Co., in U.S.A., in order to control the hardware of the UI, to drive the edit pads 513 and 514, and to process the received data of the touch screen 503 and to write the results on the CRT screen. The EPIB 522 uses a CPU of 16 bits such as 80C196KA made by Intel Co., and transfers the depicting data of the bit map area to the UICB in the DMA mode. The 16-bit CPU is used because a CPU of 8 bits is unsatisfactory to gain the function to depict data in the bit map area. In this way, the many functions used are decentralized.

In the U/I of the present invention, creations are introduced into the display screen layout and its controls, enabling use of the compact display. For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only minimum necessary information. For the display containing different items of information, color and emphatic indications are used so that the operator can readily and distinctly recognize the necessary information on the display screen from among the information.

Figure 10A:
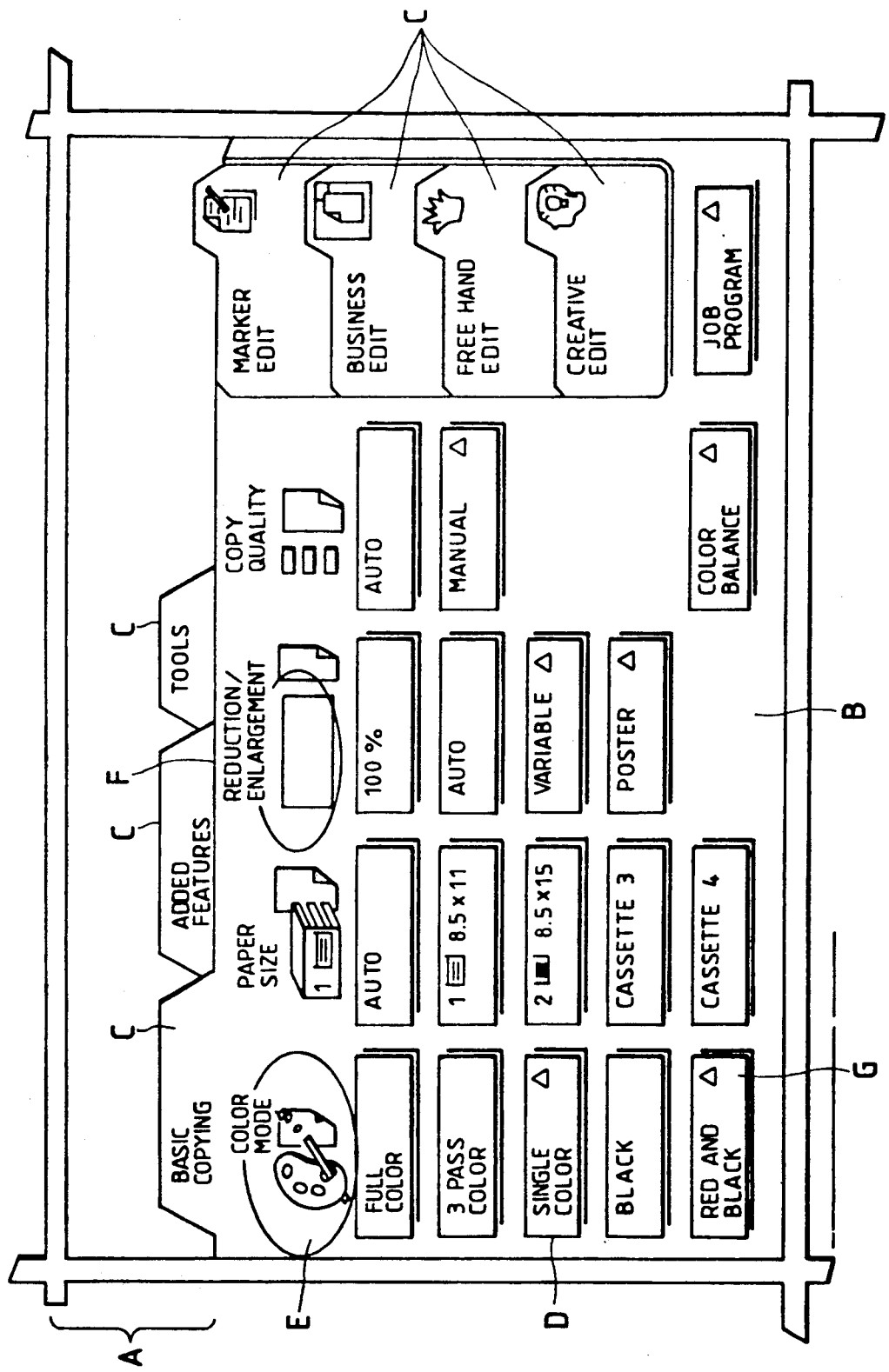
FIGS. 10(a) and 10(b) show the displays for the instructive controls.
Figure 10B:
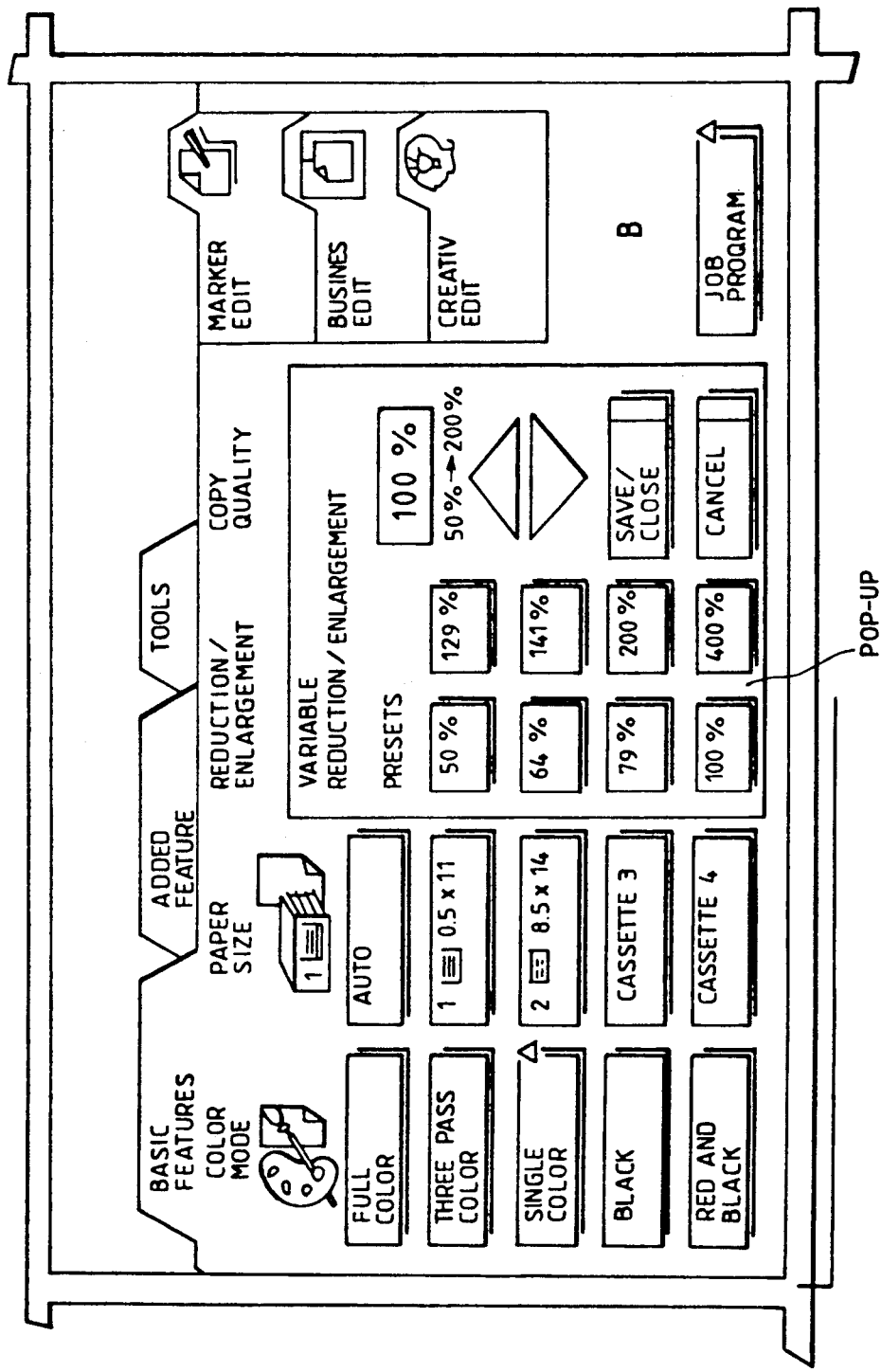

FIG. 10 shows some layouts of the display screen. FIG. 10(a) shows a basic copy display. FIG. 10(b) shows a display in which a pop-up display is inserted in the basic copy display.

In the user interface according to the present invention, an initial display is the basic copy display for setting copy modes as shown in FIG. 10. The display for setting copy modes is divided into two sections, a message area A and a pathway area B.

The message area consists of the upper three lines on the screen. The first line is for a statement message. The second and third lines are for various messages, such as a guide message when different functions are contradictorily selected, message showing a faulty state of the machine, and an alarm message. The right end portion of the message area is used as an area for displaying the number of copies, such as the number of copies set by ten keys, and the number of copies being under copying operation.

The pathway area B is an area to select various functions, and contains many pathways of a basic copy, added feature, marker edit, business edit, free hand edit, creative edit, and tool. The pathway tabs C for those pathways are displayed. Each pathway uses a pop-up function for improving the operability. The pathway area B further contains soft buttons D as choices for selecting functions by touching it by the finger, an icon (picture) E for indicating the function selected, and an indicator F for indicating magnification percentages. Those soft buttons with the pop-up functions are each marked with a pop-up mark G of Δ. By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button.

The basic copy display and other displays are sorted so as to maximize a community between it and other devices, and that between the soft panel and the hard console panel. Further, the edit displays consist each of a plurality of levels that can be selected in accordance with a degree of skill of the operator. Further, the pop-up function is used. Of those function displayed, the functions requiring a high level of technique or complicated functions are displayed in a pop-up manner. A display shown in FIG. 10(b) appear when the reduction/enlargement function is selected, the pop-up is opened by touching a variable reduction/enlargement soft button.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

The hard control panel, as shown in FIG. 2 is disposed on the right side of the color display panel, and is slightly bent toward the center. The control panel is provided with various buttons of ten keys, ten key clear, all clear, stop, interrupt, start, information, auditron, and language.

The hard control panel is also provided with LEDs (light emitting diodes) for indicating operations of the respective buttons.

(I-7) Film Image Reader

Figure 11:
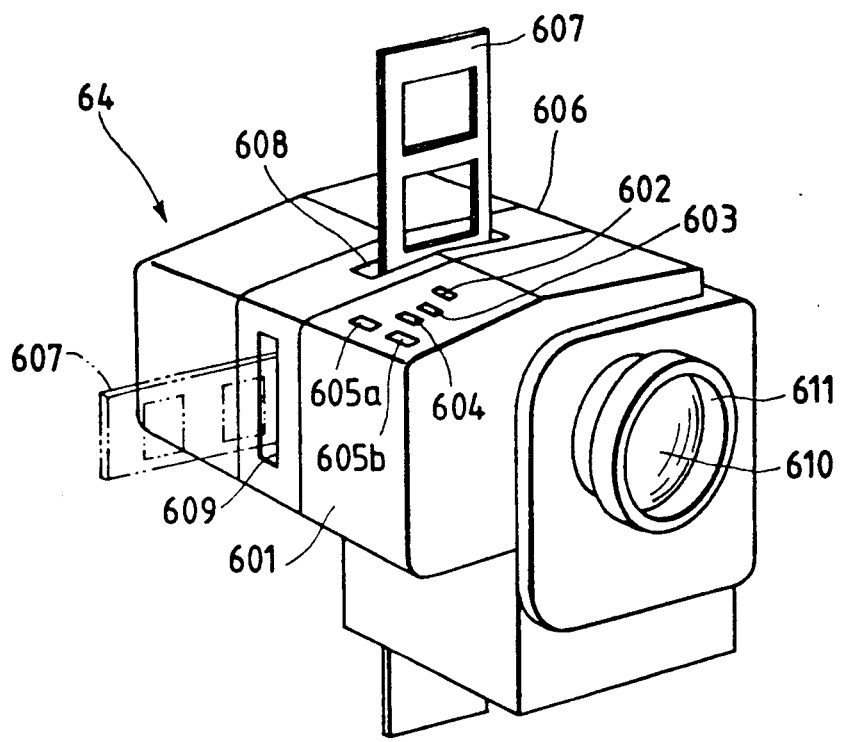
FIG. 11 shows a perspective view of an film projector (F/P) for the coping machine shown in FIG. 2.

The film image reader, as shown in FIG. 2, is composed of a film projector (F/P) 64 and a mirror unit (M/U) 65. FIG. 11 shows a perspective view of the F/P, FIG. 12 a perspective view of the M/U, and FIG. 13 shows a schematic illustration of the F/P, and relationships among the F/P, M/U, and IIT.

As shown in FIG. 11, the F/P 64 is provided with a housing 601. The housing 601 is further provided with an operation check lamp 602, manual lamp switch 603, auto focus/manual focus (AF/MF) select switch 604, and manual focus (M/F) operation switches 605a and 605b. The housing 601 is further provided with an open/close member 606 swingable for open and close. Slots 608 and 609 are formed in the upper surface and the side wall of the open/close member 606. A film holder 607 holding an original film 633 is inserted into the housing 601 through either of these slots. In use, these slots are selectively used in accordance with the orientation of the image recorded in the film 633. Slots (not shown) are additionally formed in the bottom surface and the wall opposite to the above. Through these slots, the film holder 607 may be ejected. The open/close member 606 is hinged to the housing 601 or removably mounted to the housing 601. With provision of the open/close member 606 thus mounted, when foreign material enters the housing 601, an operator opens the member 606, and may remove the material.

In this instance, two types of film holders are used, one for the 35 mm negative film, and the other for the 35 mm positive film. The F/P 64 accepts these types of films, and further negative films of 6 cm×6 cm and 4"×5". In the case of the negative film, in use it is closely placed between the M/U 65 and the platen glass 31.

A lens holder 611 holding a projection lens 610 is slidably supported in the right portion of the housing 601 as viewed in the drawing.

Within the housing 601, a reflector 612 and a light source lamp 613 such as a halogen lamp is disposed in alignment with the projection lens 610 with respect to an optical axis. A cooling fan 614 for cooling the lamp 612 is disposed near the lamp 613. An aspheric surface lens 615 for converging rays of light from the lamp 613, heat wave absorbing filter 616 for cutting off the light of a predetermined wave length, and a convex lens 610 are disposed on the right side of the lamp 613 and in alignment with the same with respect to the optical axis.

An automatic exchanger for correction filter is installed on the right side of the convex lens 617. The automatic filter exchanger includes a correction filter holder 618, motor 619, first and second position sensors 620 and 621, and controller (not shown, but is housed in the F/P 64) for controlling the drive motor 619. The filter holder 618 holds a correction filter 635 for correcting a film density of the 35 mm negative film and the positive film. The correction filter illustrated is for one of the two types of films. The motor 619 drives the filter holder 618. The first and second position sensors 620 and 621 are for detecting angular displacements of the filter holder 618. In use, a correction filter corresponding to the original film 633 is automatically selected from those contained in the filter holder 618, and is aligned with the projection lens 610 and other lenses with respect to the optical axis. The automatic filter exchanger 635 may be located at any other place than the above, if it lies on an optical axis of the projection light, for example between the platen glass 31 and the imaging unit 37.

An auto focus device is further installed, which is composed of a light emitting means 623 for automatic focus sensor and a photo detector 624 both being interlocked with the lens holder 611, and a motor 625 for sliding the lens holder 611 of the projection lens 610 with respect to the housing 601. When the film holder 607 is inserted through the slot 608 or 609 into the housing 601, the original film 633 contained in the film holder 607 is positioned between filter holder 618 and the paired photo diode 623 and photo detector 624. A fan 626 for cooling the original film 633 is located near the place where the original film 635 is set.

A power supply for the F/P 64 is different from that for the base machine 30, but is installed within the base machine 30.

Figure 12:
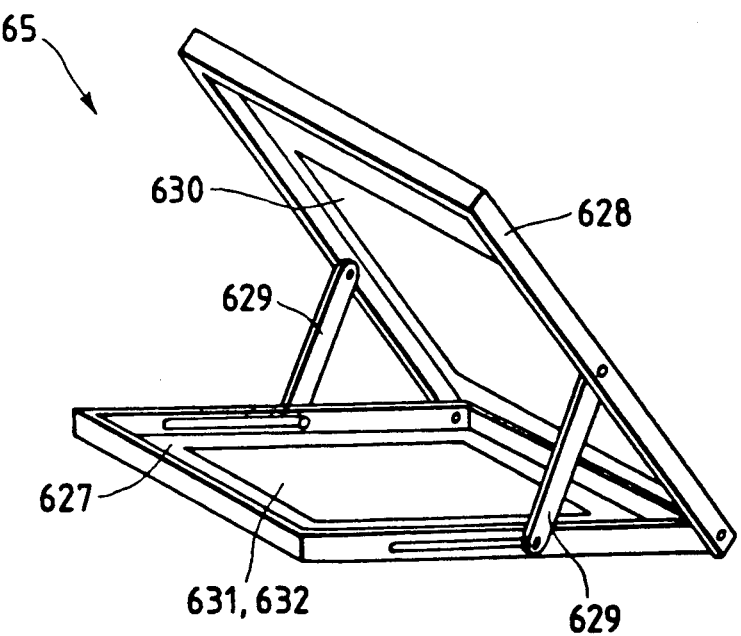
FIG. 12 is a view of an mirror unit (M/U) for the coping machine shown in FIG. 2.
Figure 13:
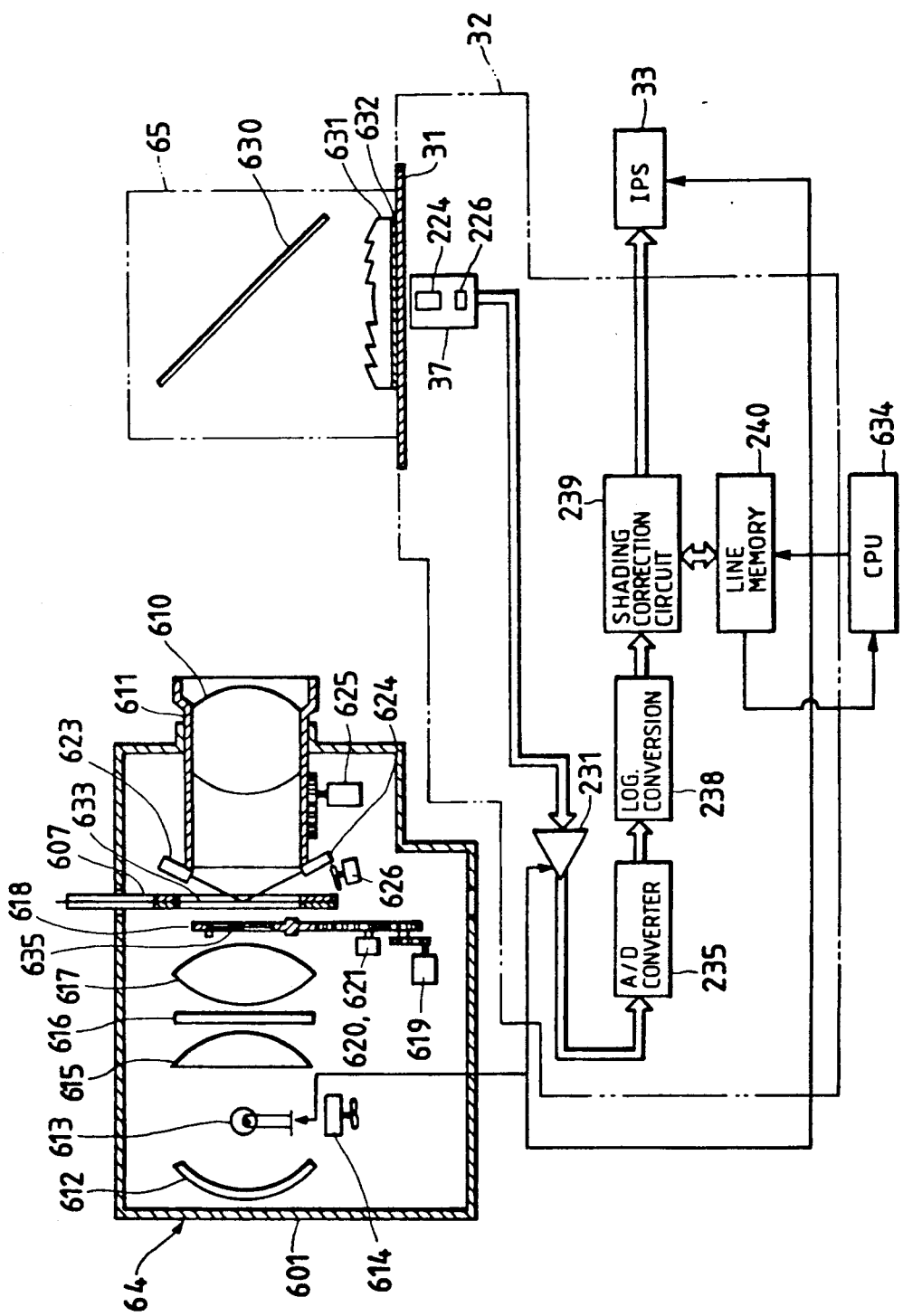
FIG. 13 is a configuration of the F/P in connection with the F/P, M/U and image input terminal (IIT)

As shown in FIG. 12, the mirror unit (M/U) 65 is made up of a bottom plate 627 and a cover 628 swingably mounted at one end of the bottom plate 627. A couple of supports 629 and 629 are swingably coupled between the bottom plate 627 and the cover 628. The paired supports 629 and 629 support the cover 628 left open at 45° with respect to the bottom plate 627 when the bottom plate is maximally opened.

A mirror 630 is mounted to the rear side of the cover 628. The bottom plate 627 has a large opening which is filled with a fresnel lens 631 and a diffusion plate 632.

As best illustrated in FIG. 13, the fresnel lens 631 and the diffusion plate 632 are formed by a single acrylic plate. The top surface of the acrylic plate constitutes the fresnel lens 631, and the bottom surface constitutes the diffusion plate 632. The fresnel lens 631 converts the light reflected from the mirror 630 that otherwise will spread out, into parallel rays of light, thereby to preventing the peripheral portion of an image from being darkening. The diffusion plate 632 minutely diffuses the parallel rays of light to such an extent as to prevent the line sensor 226 from detecting a shadow of the selfoc lens 224 within the imaging unit 37.

When the color copy using the F/P 64 is not used, the mirror unit 65 is folded and stored in a given storage place. In use, it is opened and placed at a predetermined location on the platen glass 31 of the base machine 30.

Major functions of the film image reader are: an auto exchange of correction filter, original film inserting direction detection, auto focus (AF) function, manual focusing (MA) function, manual turn-on of light source lamp, automatic changing of magnification and scan area, automatic shading correction, and automatic image quality adjustment.

(II) Input Terminal (IIT)

A preferred embodiment of the present invention will be described by using an image input terminal (IIT) of a copying machine.

(II-1) Imaging Unit Drive Mechanism

Figure 14:
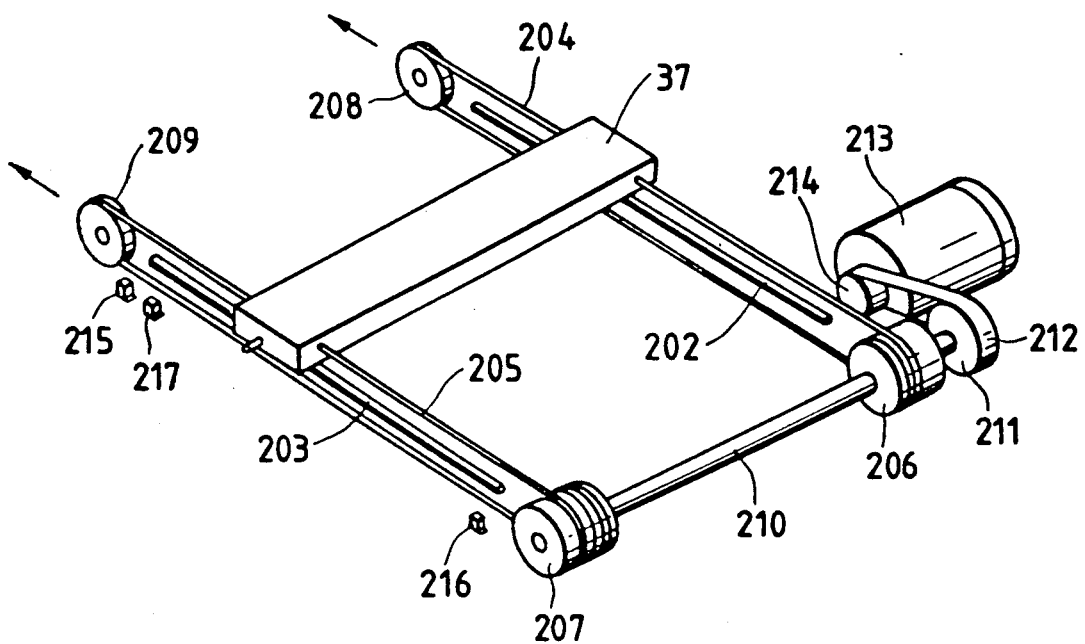
FIG. 14 shows a perspective view showing an original scanning mechanism for the coping machine shown in FIG. 2.

FIG. 14 perspectively shows an imaging unit drive mechanism used in the color copying machine according to the present invention.

In the imaging unit drive mechanism, the imaging unit 37 is removably placed on a pair of slide shafts 202 and 203, and is fixed at both ends to wires 204 and 205. These wires 204 and 205 are wound around drive pulleys 206 and 207 and tension pulleys 208 and 209, respectively. The tension pulleys 208 and 209 are pulled in the direction of arrows. The paired drive pulleys 206 and 207, and a reduction pulley 211 are mounted to a drive shaft 210. The drive shaft 210 is further coupled with an output shaft 214 of a stepping motor 213 by means of a timing belt 212. Limit switches 215 and 216 serve as sensors for sensing an abnormal operation of the imaging unit 37. A registration sensor 217 senses a document read start position.

The reason why the stepping motor 213 is used for driving the imaging unit 37 will be described below.

To make a sheet of copy of four colors Y, M, C, and K, the imaging unit 37 must repeat the scan four times. It is a significant matter how to reduce an out-of-synchronization of the scan and a displacement from the document read start position. Key points to coy with the above problems are to minimize a variation of the stop position of the imaging unit 37 and a variation of the time taken for the imaging unit 37 to travel from the home position to the registration position, and to secure a satisfactory reproducibility of a scan speed variation. The stepping motor rather than the DC motor is suitable for such controls to minimize the stop position variation of the imaging unit 37 and the time variation when the imaging unit travels from the home position to the registration position. It is for this reason that the stepping motor is used for driving the imaging unit 37.

The stepping motor having such good controllability, however, are inferior to the DC servo motor in that it generates large vibration and noise. Aging of the timing belt 212, and wires 204 and 205, and instable mechanical factors, such as viscosity resistance between the slid pad and the slide rails 202 and 203, inevitably exist. Those factors deteriorates a scan reproducibility. Some measure must be taken for the problems of the stepping motor, in order to improve quality of a reproduced picture and operating speed of the copying machine.

Figure 15:
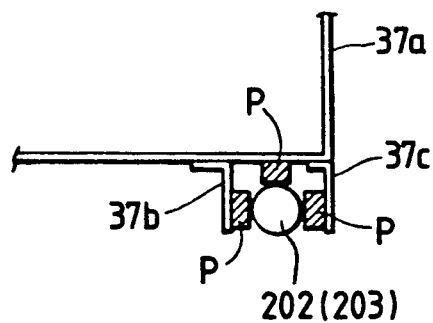
FIG. 15 shows a sectional view of a major portion of FIG. 14.

To cope with this, in the instant embodiment, a couple of slide shafts 202 and 203 are arrayed in parallel. An angle 37b, plate spring 37c, and oil-impregnated pads P are made intervene between the housing 37a and each slide shaft 202 and 203 of the imaging unit 37, as shown in FIG. 15. Such a structure successfully minimizes a vibration of the imaging unit 37 in the main scan direction.

(II-2) Control System for the Stepping Motor

Figure 16A:
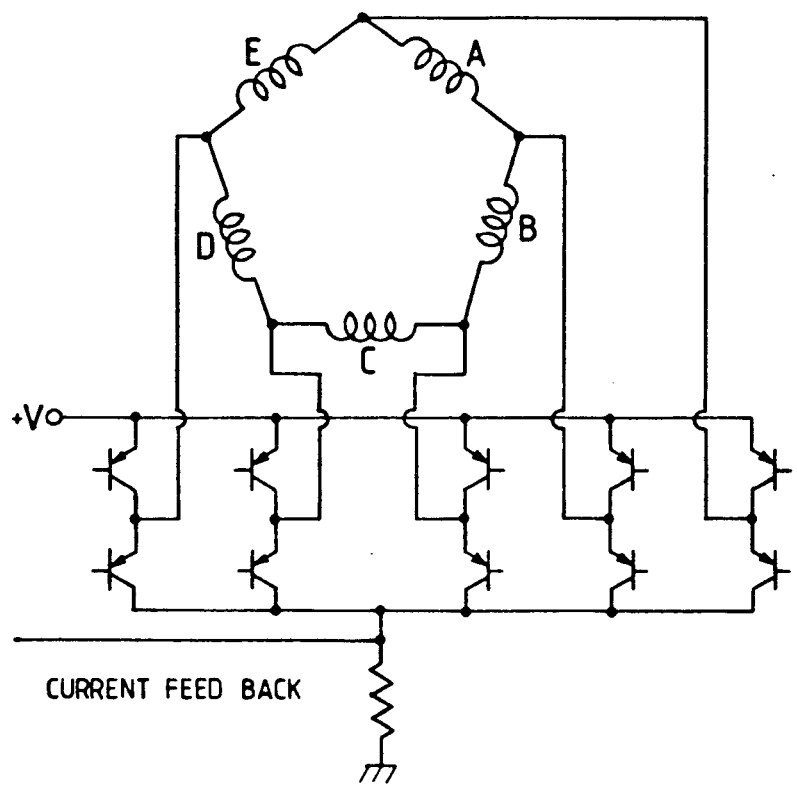
FIG. 16(a) shows a circuit arrangement of a drive circuit for a stepping motor to move an imaging unit shown in FIG. 19.
Figure 16B:
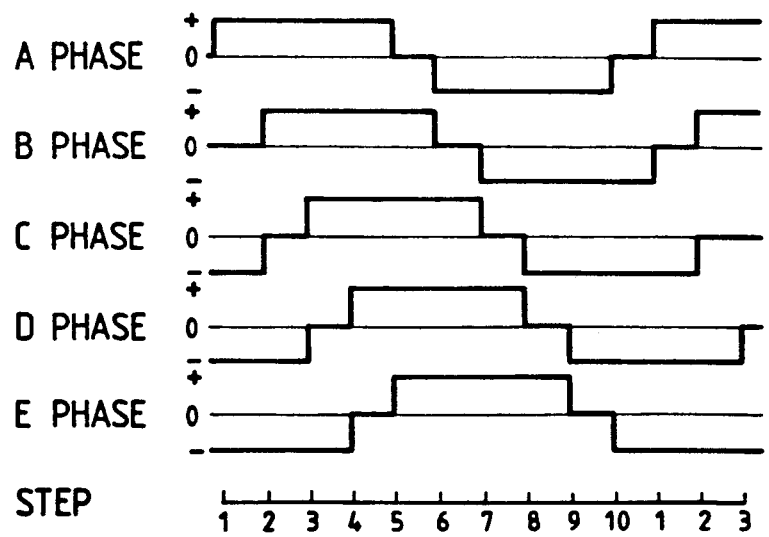
FIG. 16(b) shows an exciting sequence for the circuit shown in FIG. 16(a)

FIG. 16(a) shows a circuit diagram of a driver of the stepping motor 213. The stepping motor 213 is arranged such that a motor winding is wired in a pentagon fashion, its connection points are connected through pairs of transistors to the positive and the negative terminals of a power supply, and the motor is driven in a bipolar mode using ten transistors. The motor current is fed back so as to keep constant the current supplied to the motor. In the exciting sequence, as shown in FIG. 16(b), when the four phases are excited, the remaining one phase is shorted at the positive or negative equal potential.

Figure 16C:
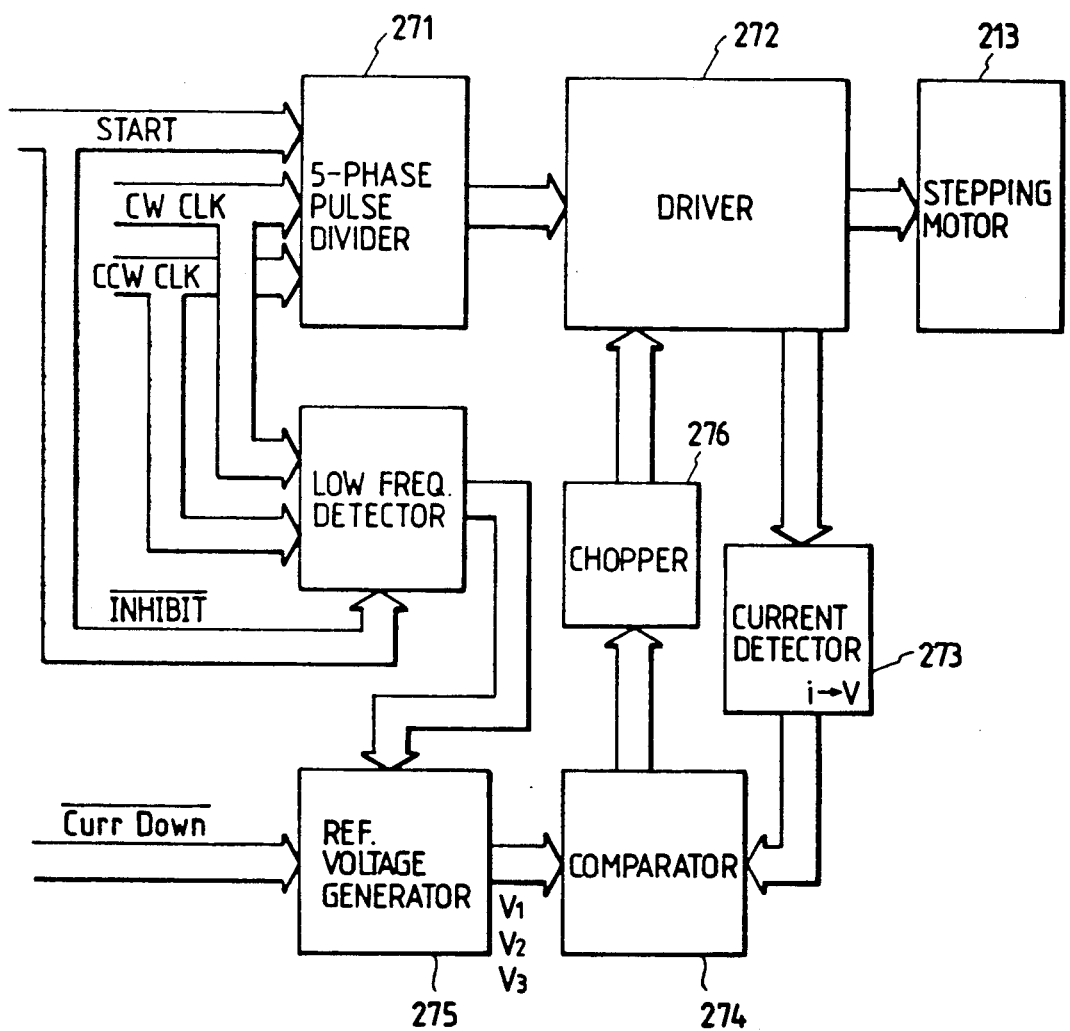
FIG. 16(c) shows a block diagram of a driver using the drive circuit shown in FIG. 16(a)

A control circuit for the driver will be described with reference to FIG. 16(c). In the figure, when a START signal and a forward clock signal CW are a reverse clock signal CCW are input to a 5-phase pulse divider 271. In response to the clock signal, the 5-phase pulse divider 271 distributes pulses to the driver 272. Upon receipt of the pulses, the driver 272 feeds current to the stepping motor 213, and drives it. The current flowing through the stepping motor 213 is detected by a current detector 273, which in turn converts the current "i" into voltage "v". A comparator 274 compares the voltage "v" with a reference voltage v1 or v2 as generated by a reference voltage generator 275. When the voltage is larger than the reference voltage v1 or v2, a chopper 276 and the driver 272 are turned off, so that the current fed to the stepping motor 213 is kept constant.

The two types of reference voltages as previously set in the reference voltage generator 275 are a high voltage v1 (FULL) and a low voltage v2 (HALF). The high voltage v1 is set when the stepping motor 213 is being accelerated and a high torque is required, and when the imaging unit is in a return mode and a clock frequency is high. The voltage V2 is set when the acceleration of the imaging unit terminates and is in a normal scan mode. There frequently occurs a situation that a START signal is applied to the pulse divider 271, but neither the forward clock signal CW nor the reverse clock signal CCW is applied to it. In such a situation, current concentrically flows into a specific transistor alone, and will destroy the transistor. To avoid this, a low frequency detector detects this stage, and sends an instructive signal to the reference voltage generator 275, and instructs the generator to reduce the voltage now being generated to a voltage V3.

Figure 17A:
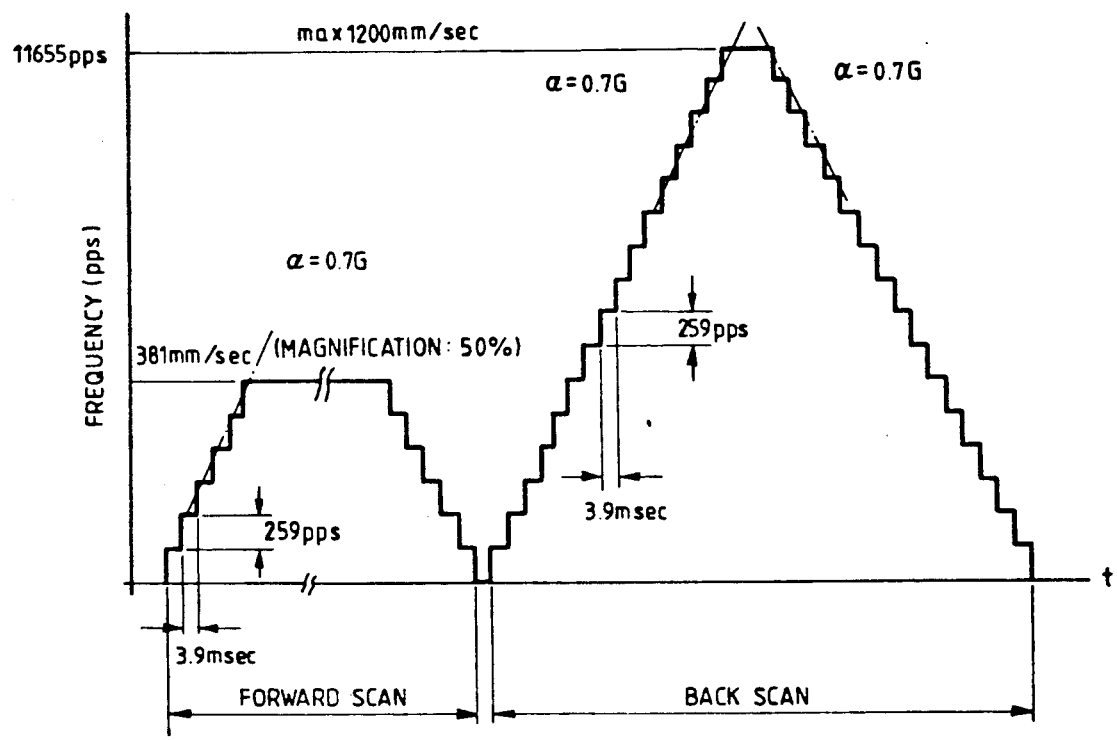
FIGS. 17(a) and 17(b) show diagrams for explaining a scan cycle by the imaging unit in the coping machine shown in FIG. 2.
Figure 17B:
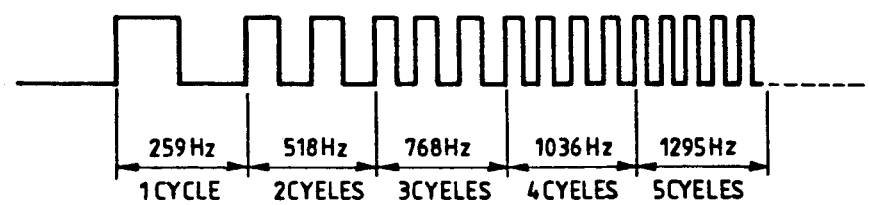

FIG. 17(a) shows a scan cycle of the imaging unit 37 driven by the stepping motor 213. More specifically, the figure also shows a variation of a speed of the imaging unit 37, viz., a frequency of a signal applied to the stepping motor, with respect to time, when the imaging unit executes a forward scan and a back scan at the 50% magnification, or the maximum speed. In an acceleration mode, as shown in FIG. 17(b), the frequency is increased up to approximately 11 to 12 kHz in steps of 259 Hz and every cycle. Putting a rule into a linear array of a train of pulses makes the pulse generation easy. If so, a trapezoidal profile of speed variation may be formed by increasing the signal frequency of the rate of 259 pps/3.9 ms, as shown in FIG. 35(a). Rest periods are provided between the forward scan and the back scan, and between the backward scan and the forward scan. During the rest periods, the vibration in the IIT mechanical system settles down, and the synchronization of the imaging unit operation with the image outputting in the IOT is secured.

To read a color original, the imaging unit 37 must repeat the scan four times to read signals of four colors. It is a significant matter, therefore, how to reduce color displacement among the four colors. To this end, it is necessary to reduce displacement of the stop position of the imaging unit 37, to reduce time for the imaging unit to move form the home position to the registration position and to suppress a variation of the scan speed.

Figure 18A:
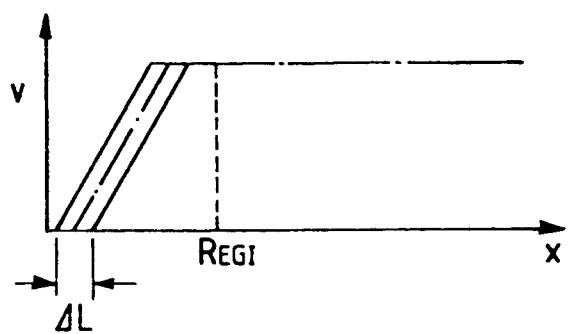
FIGS. 18(a) and 18(b) show an explanatory diagram for explaining the cause of color displacement in the color copy.
Figure 18B:
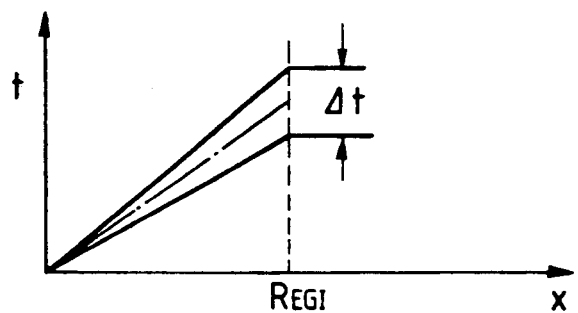
Figure 18C:
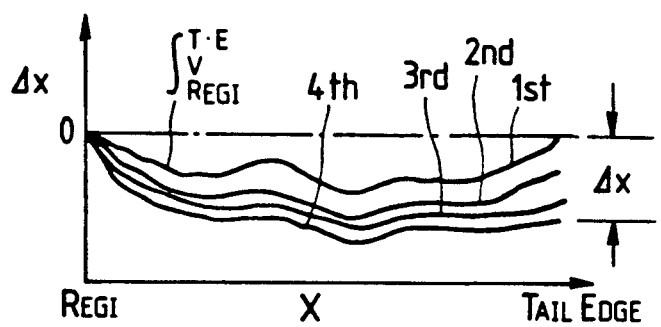

FIG. 18 shows a diagram useful in explaining the color displacement due to that vibration. FIG. 18(a) shows that the imaging unit, after scanned, stops at a position displaced by LINE from an original stop position. In the next scan, time for the imaging unit to reach the registration position is different from a correct time. As a consequence, the color displacement occurs in the reproduced color image. As shown in FIG. 18(b), with a transient vibration of the stepping motor, or speed fluctuation till the motor speed settles down at a steady speed, during the 4-scan period, the time taken for the imaging unit to reach the registration position becomes different from a predetermined time by t, and consequently a color displacement is caused. FIG. 18(c) shows different variations of the constant speed scan characteristic of the imaging unit when the imaging unit is moved for scanning four times between the registration position and the tail edge. As seen, the speed of the imaging unit of the first scan more greatly varies than those of the imaging unit of the second to fourth scans. From this fact, it is clear that if the yellow toner is developed in the first scan, the color displacement due to the speed variation of the first scan can be reduced to be indistinctive.

(II-3) Imaging Unit (A) Outline

Figure 19:
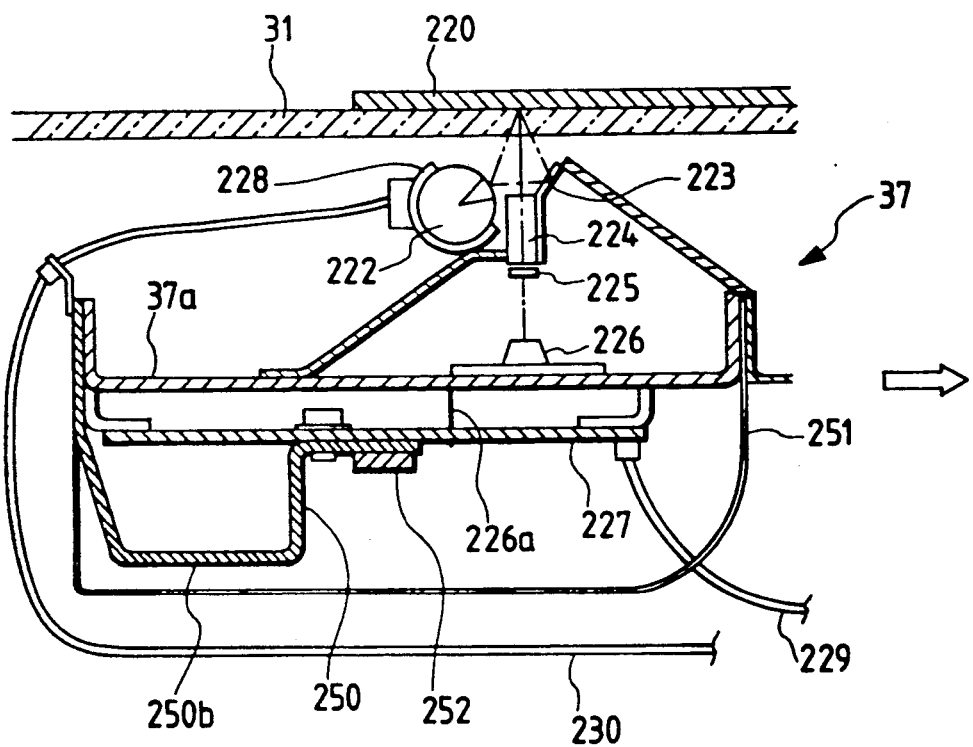
FIG. 19 is a sectional view showing an imaging unit for the coping machine shown in FIG. 2.

FIG. 19 shows a sectional view of the imaging unit 37.

In the figure, an original 220 is set on the platen glass 31, with its image surface facing down. The imaging unit 37 moves under the platen glass in the direction of arrow. Throughout the movement of the imaging unit, the image surface of the original place on the platen glass is illuminated with the combination of the daylight fluorescent lamp 222 and a reflecting mirror 223. Light reflected from the original 220 passes through a SLFFOC lens 224 and a cyan filter 225, and forms a normal equal-size image on the light receiving surface of a CCD sensor array 226. The selfoc lens 224 is a compound eye lens consisting of four rows of fiber lens. This lens is bright and has a high resolution. This lens is advantageous in that a power consumption of the light source is reduced and the imaging unit is made compact. A circuit board 227 containing a CCD line sensor drive circuit, CCD line sensor output buffer circuit, and the like, is mounted on the imaging unit 37. In the figure, reference numeral 228 designates a lamp heater; 229 a flexible cable for control signals; 230 a flexible cable for the illumination power source. The circuit board 227 underlies a base member 37a fixedly coupled with the line sensor array 226. The radiating plate 250 with the convexity 250b intervenes between the circuit board 227 and the base member 37a. A punching metal 251 for magnetic shield is provided covering the radiating plate 250. An IC chip 252 for the driver is mounted on the circuit board 227. A connection pin 226a mechanically and electrically couples the line sensor array 226 to the circuit board 227.

Figure 20:
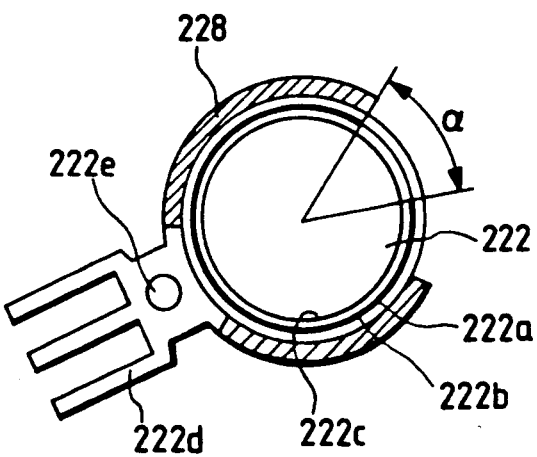
FIG. 20 shows a sectional view of a fluorescent lamp for the imaging unit shown in FIG. 19.

FIG. 20 illustrates the details of the fluorescent lamp 222. A reflecting film 222b is formed over the inner surface of a glass tube 222a except the surface portion as defined by an aperture angle "a" (about 50°). A fluorescent film 222c further lies on the surface of the reflecting film. With this structure of the lamp, light of the lamp 222 can be effectively projected to the original and the electric power is saved. The structure that the fluorescent film 222b is applied to the entire inner surface of the lamp, and the reflecting film 222b is formed on the inner surface except the portion defined by the aperture angle is employed for reducing the peaks of emission lines of mercury. In this case, the light emitted from the lamp is reduced somewhat. A lamp heater 228, and a heat sink (radiating member) 222d are disposed on the outer surface of the lamp 222. A thermistor 222e provided gathers temperature data for controlling a lamp heater 228 and the cooling fan.

(B) CCD Line Sensor

Figure 21A:
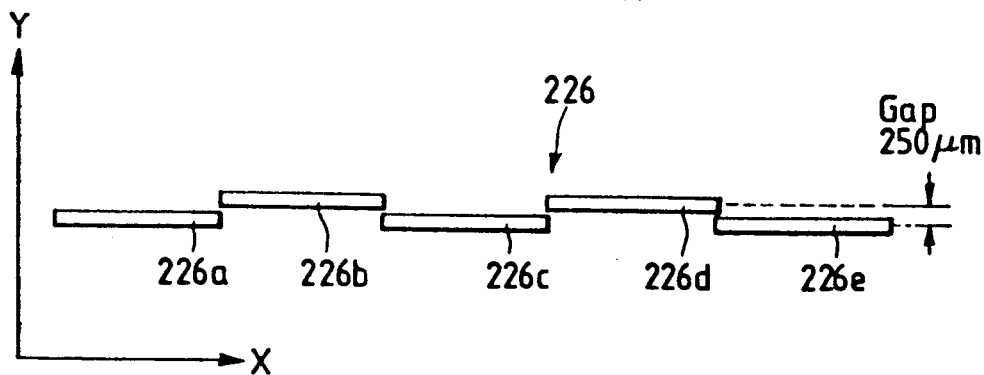
FIG. 21(a) shows a layout of CCD line sensors for the imaging unit shown in FIG. 19.

FIG. 21 shows an array 226 of CCD line sensors. Five CCD line sensors 226a to 226e are arrayed in zig-zag fashion in the main scan direction. Such an array of the CCD sensors is used because when a single CCD line sensor is used, it is difficult, when allowing for the wafer size, production yield, cost, etc., to array a number of photo sensor elements without any dropped elements, and to obtain a uniform sensitivity. When a plurality of CCD line sensors are arrayed in a line, it is difficult to form pixels in the CCD line sensor out to both end portions. Light insensitive portions are present in the CCD sensor where pixels have been dropped.

Figure 21B:
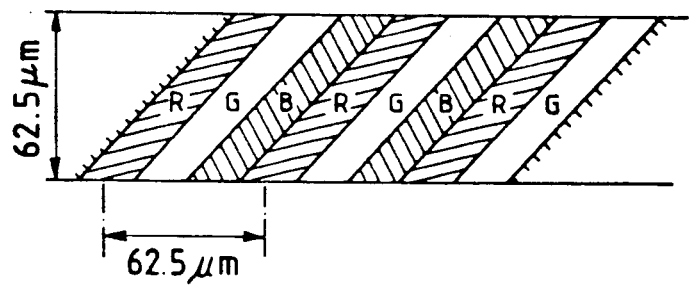
FIG. 21(b) shows a layout of color filters used in connection with the CCD line sensor shown in FIG. 21(a)

As shown in FIG. 21(b), in the sensor portion of the CCD line sensor array 226, trios of R (red), G (green), and B (blue) color filters are repeatedly arrayed. Three adjacent bits form one pixel which is used at the time of reading. When the read pixel density of each color is 16 dots/mm and the number of pixels of each chip is 2928, the length of one chip is: $2928/(16\times3)=61$ mm and the total length of five chips is: $61\times5=305$ mm. Accordingly, a CCD line sensor of the equal-size type capable of reading an original of Z3 can be obtained. The respective pixels of R, G and B are slanted by 45°, to reduce moire.

Where a plurality of CCD line sensor elements 226a to 226e are arrayed in a zig-zag fashion, the adjacent CCD line sensor elements scan different portions of the original surface. When the original is scanned by moving the CCD line sensor elements in the vertical scan direction Y orthogonal to the main scan direction X, there is a time lag between the signals derived from the CCD line sensor elements 226b and 226d of the first row that precedingly scan the original and the signals derived from the CCD line sensor elements 226a, 226c and 226e of the second row that succeedingly scan the original. The time lag corresponds to a difference between the positions where the CCD line sensor elements of the first and second rows are located.

(C) Zig-Zag Correction

To obtain a train of consecutive signals from the image signals dividedly read by the plurality of CCD line sensor elements, the signals from the first row CCD line sensor elements 226b and 226d that precedingly scan the original are stored, and the stored signals must be red out in synchronism with the outputting of the signals from the second row CCD line sensor elements 226a, 226c and 226e that scan the original succeeding to the first CCD row line sensor elements. In this case, if a displacement between the first and second lines is 250 um and the resolution is 16 dots/mm, a delay of 4 lines is needed.

In the image reading apparatus, the magnification in the main scan direction is adjusted in the video circuit through the processing of thinning or thickening. The magnification in the vertical scan direction is adjusted by controlling a moving speed of the imaging unit 37. Accordingly, the resolution in the vertical scan direction is changed by changing the moving speed of the imaging unit 37, while the reading speed (the number of read lines per unit time) of the image reading apparatus is fixed. If the resolution is 16 dots/mm at the 100% magnification, the magnification percentage, speed, resolution and the number of zig-zag correction lines are as shown in the following table.

| Magnification (%) | Speed (times) | Resolution (dots/mm) | Zig-Zag Correction (No. of lines) |
|---|---|---|---|
| 50 | 2 | 8 | 2 |
| 100 | 1 | 16 | 4 |
| 200 | ½ | 32 | 8 |
| 400 | ¼ | 64 | 16 |

Figure 22:
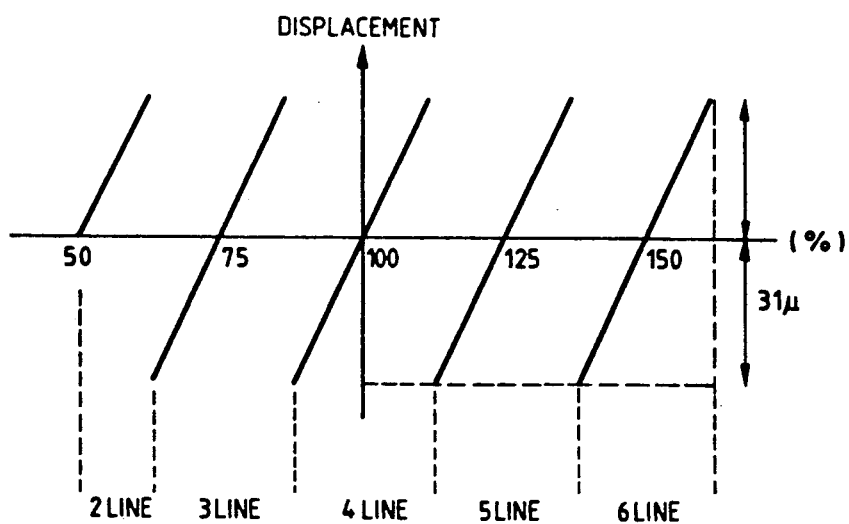
FIG. 22 shows the relationship between magnification and read displacement for the imaging unit shown in FIG. 19.

As seen from the above table, as the magnification percentage increases, the resolution increases, and hence the number of necessary line memories for correcting the difference 250 um in the zig-zag array of the CCD line sensor elements is also increased. FIG. 22 shows the relationship between displacement and magnification percentage. As seen, correction of one line is made every one-pixel displacement by the change of the magnification. A maximum of 31 um of displacement is generated every on-line correction. This figure, however, is negligible in practical use.

Figure 23:
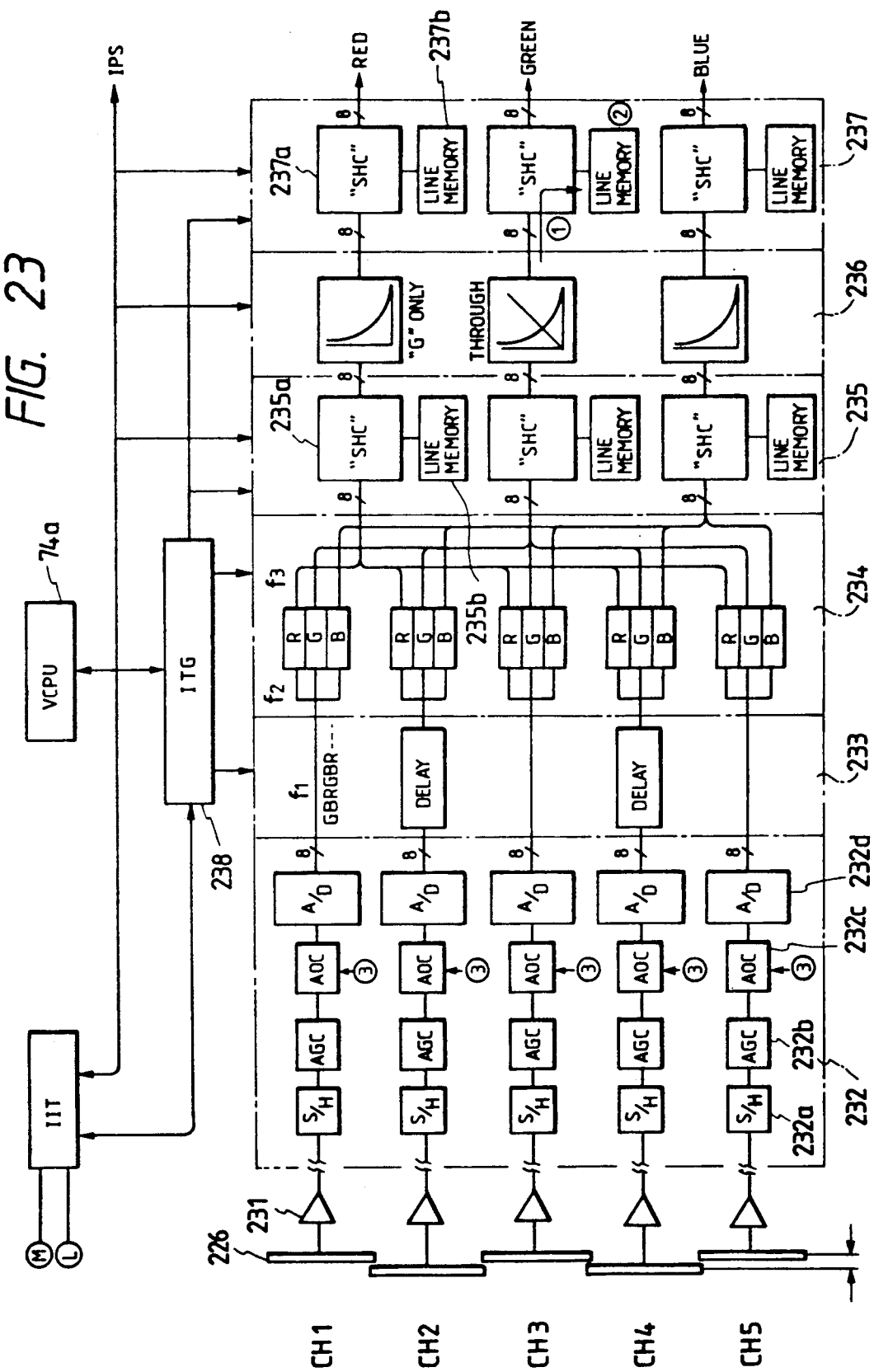
FIG. 23 is a block diagram showing a video signal processing circuit for the coping machine shown in FIG. 2.

(II-4) Video Signal Processing Circuit (A) Configuration of a Video Signal Processing System Description to be given below with reference to FIG. 23 is elaboration of a video signal processing circuit in which a color original is read for each trio of colors R, G and B in terms of reflective signals by using the CCD line sensor array 226, and the reflective signals are converted into digital signals as density signals.

In FIG. 23, a read data control/converter 232 samples and holds analog video signals, applies gain and offset control to the signals, and converts them into digital signals. The control/converter 232 is made up of a sample/hold circuit 232a, automatic gain control circuit (AGC) 232b, automatic offset control (AOC) 232c, and A/D converter 232d. A white signal (read signal from a white reference board) of the CCD line sensor and a black signal (output signal in dark condition) slightly differ for different chips and different pixels in one chip. The AGC 232b sets a peak value of the white signal of each channel to a reference value, e.g., "200" in the scale of 256 gray levels. The AOC 232c sets a minimum value of the black signal to a reference value, e.g., "10" in the same scale. When the minimum value of the black signal is larger than the reference value of the A/D output level, the AOC 232c decreases the minimum value to the reference value. When the minimum value is smaller than the reference value as of the channel 2, the AOC decreases the minimum value to the reference value.

An ITG (IIT timing generator) 238 is provided for controlling a delay setting circuit 233 for making the zig-zag correction and a separation/composing circuit 234. Specifically, the ITG 238 controls delay amounts for zig-zag correction in accordance with the contents of a register within a VCPU 64a, adjusts outputting timings of the CCD line sensor elements of the five channels, and separates the video signal into color signals of colors B, G and R. The ITG 238 contains various types of registers; a register for storing a zig-zag correction amount corresponding to a magnification, a register for storing a delay amount of the IPS pipe line, a register for storing a correction amount of the registration in the main scan direction, a register for storing an effective pixel width in the main scan direction, a register for storing a zig-zag correction controlled quantity, a register for storing a data output timing control quantity, and the like. At the time of power on, "4" corresponding to the 100% magnification is set as a zig-zag correction quantity in the register, and at the start of the copying operation, a zig-zag correction quantity is determined in accordance with a designated magnification percentage.

The delay setting circuit 233 is a so-called zig-zag correction circuit for correcting the displacement of the CCD line sensor elements of the sensor array 226 as viewed in the vertical scan direction as already described with reference to FIGS. 21 and 22. The circuit 233 is a line memory of the FIFO type. The memory stores the signals from the first line CCD sensor elements 226b and 226d that first scan an original. The memory outputs the signals in synchronism with the outputting of the signals from the second line CCD sensor elements 226a, 226c, and 226e, which succeed to the first line CCD line sensor elements. The memory, or the delay setting circuit 233 controls the number of delay lines in accordance with a delay amount as set in accordance with the designated magnification percentage.

The separation/composing circuit 234 separates a train of 8-bit data, BGRBGR ..., of each channel into color data of R, G and B, and stores them into a line memory, and serially composes the data for each color R, G and B.

Figure 24A:
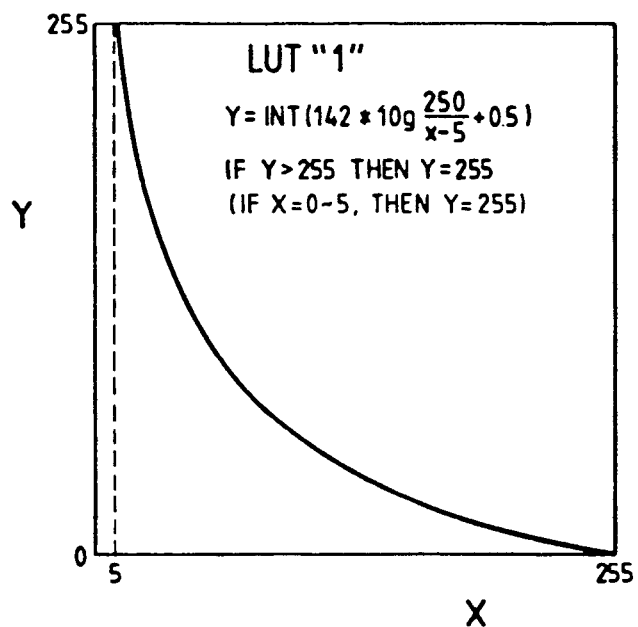
FIG. 24(a) and 24(b) shown conversion tables for converting the reflected signals into density signals in the coping machine shown in FIG. 2.
Figure 24B:
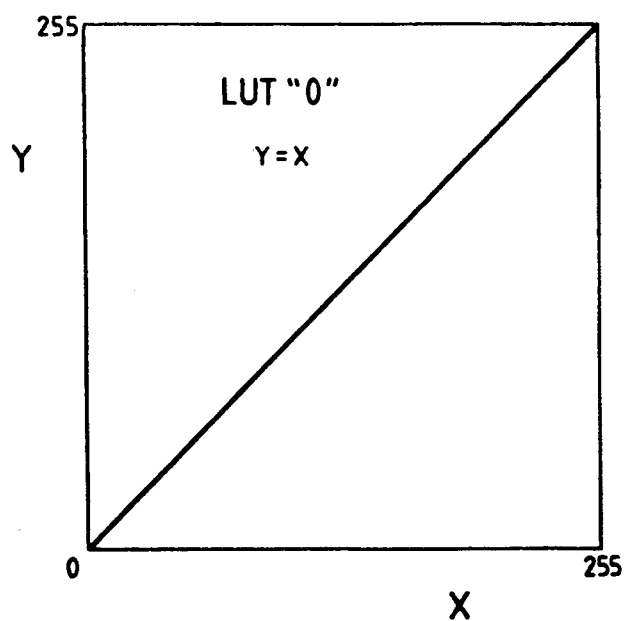

A conversion table 236 consists of two types of tables, a logarithmic conversion table LUT "1" for converting the reflected signals into density signals as shown in FIG. 24(a), and a through conversion table LUT "0" as shown in FIG. 24(b). Those tables are stored in a ROM, for example. The table 236 converts R, G and B signals of reflectance as read from an original into R, G and B density signals representative of the amounts of recording materials (e.g., toner amounts).

Shading correcting units 235 and 237 are provided. The unit 235 includes a shading correcting circuit 235a and an SRAM 235b for each color signal. The unit 237 likewise includes a shading correcting circuit 237a and an SRAM 237b for each color signal. Correction of pixel displacement and shading, and inputting control of image data are executed in the shading correcting units.

The pixel displacement correction is to make a weighted mean of the pixel data. In the signal processing circuit as mentioned above fetching R, G, and B data in parallel, the output data of R, G, and B of one pixel are not aligned with one another, as shown in FIG. 25(a), because the R, G and B filters are displaced as shown in FIG. 21(b). Accordingly, when a black line K is read, those black lines are displaced from one another, as shown. To cope with this, the weighted mean processing is used to shift the component of R to the right by distance of ⅔ pixel, and to shift the component of B to the right by distance of ⅓ pixel. As the result of the processing, the black lines K of the color signals are aligned with one another, as shown in FIG. 25(b). As shown in FIG. 25, the following patterns are selected in accordance with the R, G and B signals $$dn = Dn \text{ (not corrected)}$$

$$dn = (Dn-1 + 2Dn)/3$$

$$dn = (2Dn-1 + Dn)/3$$

where Dn and dn are input data and output data of the n-th pixel.

The shading correction is the processing to subtract the image data, which is stored as reference data in an SRAM, from image input data after the pixel displacement correction, and to output the result of the subtraction. Through the processing, correction is made of nonuniformity of the light distribution characteristic among light sources and varied light distribution characteristic of a light source due to its aging, variations in an optical system due to smear on the reflecting mirror, for example, and nonuniformity of the sensitivity among the bits in the CCD line sensor. The shading correction circuit 235a, which precedes to the conversion table 236, is for correcting a dark level (output level when the fluorescent lamp is lit off). The shading correction circuit 237a, which succeeds to the conversion table 236, is for correcting a level of a signal read from a white reference plate. The dark level data and the white level data re stored as reference data into the SRAM.

(B) Operation of the Video Signal Processing System

An operation of the video signal processing circuit will be outlined in accordance with an image signal flow.

Figure 26:
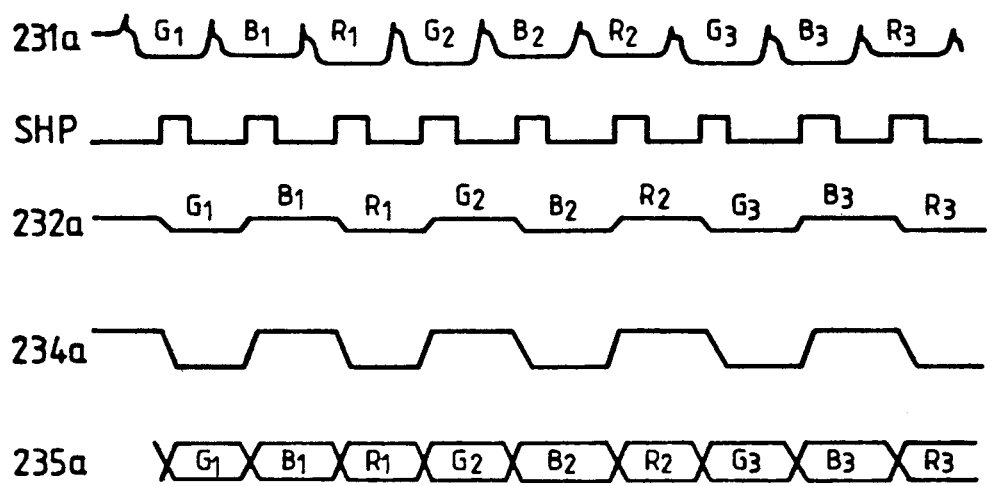
FIG. 26 shows output waveforms of the video signal processing circuit.

The CCD line sensor 226 in the imaging unit 37 reads image information on a color original dividedly in channels 1 to 5. Each channel provides a serial signal containing color data serially arrayed RGBRGB ..., as shown in FIG. 26. The serial signal is amplified up to a given level by a pre-amplifier 231, and is applied to a sample/hold circuit SH232a. In the circuit, it is held by a sample hold pulse SHP, to remove noise from it. The held signal is applied to the AGC 232b and the AOC 232c where it is subjected to a gain control and offset control. Then, it is converted into a digital signal by the A/D converter 232d. The serial digital signal RGBRGB ... is line synchronized for each channel in the delay setting circuit 233, and is separated into signals R, G, and B for each channel in the separation/composing circuit 234. Then, it composes R components of each channel into a serial digital signal of R, G components of each channel into a serial digital signal of G, and B components of each channel into a serial digital signal of B. Those serial digital signals are transferred to the shading correction circuits. The shading correction circuit appropriately applies processing to the image input data in accordance with the current mode.

In addition to the copy scan mode as mentioned above, a color detect sample scan mode is also used. In the color detect sample scan mode, the IIT carriage is first moved to a designated color detecting point, and original read density data is stored into the SRAM. Data of a specified pixel is transferred to VCPU 74a. The color detect sequence will be described in more detail. In the sequence, the IIT carriage is moved up to a designated point. After 50 msec, a signal WHTREF is issued toward the ITG 785. Data is written into the SRAM in synchronism with a line sink signal IPS-LS of the IPS. At the next line sink IPS-LS, the ITG issues a signal WHTINT, so that pixel data of the designated point is transferred to the RAM of the VCPU 784. The 50 msec corresponds to time taken for the IIT carriage to come to stop and is at rest. This color detect is applied to an area of five pixels as counted from the designated point in the main and vertical scan directions. Accordingly, of the pixel data of one line in the main scan direction as stored into the SRAM, the pixel data of five pixels including the pixel at the designated point and the consecutive pixels are read out of the SRAM, are written into the RAM of the VCPU 74a. Further, the IIT carriage is moved four time every pulse, and pixel data are written every five pixels. The above sequence of color detect is for the case of a single designated point. If the number of designated point is five, a similar sequence is repeated for each designated point.

(C) Adjustment of Read Data

A light source projects light onto the original, and the CCD sensor reads light reflected from the original. As the signal becomes whiter, a level of a signal derived from the CCD sensor when it reads a color image on an original is higher in accordance with the reflectance. Consider a case that with the A/D converter having an input range of 0 to 2.5V, the input analog image signal 255. In this case, if a signal level of the white reference board is assigned to 2.5V, a precision of reading the original color image is improved. Accordingly, the input color signal is gain adjusted so that the signal level from the white reference board is set at approximately 2V, and the signal of 2V, when digitized, is divided into 256 steps. When the copying machine incorporating the imaging unit under discussion is used for a long time, an amount of light emitted from the light source decreases due to its aging. With the decreased light amount, the signal level from the white board drops and a resolution for one bit degrades. A reflectance of the white reference board is approximately 80%. If the signal level from the white reference board is set at a more increased value, e.g., 2.3V, saturation occurs at a white portion as a bright portion on the original.

Even in such a situation, the automatic gain control (AGC) is used to stably provide a satisfactory resolution. Where the signal level from the white reference board is set at 2.OV, the AGC controls its gain so as to maintain the signal level at that value. In this way, an optimum gain can always be secured even when chips of nonuniform sensor sensitivities are used.

When the fluorescent lamp is being lit off, a signal derived from the CCD sensor (output level in a dark state, i.e., data level) is at the minimum level. The dark level is not flat in variation, but traces various curves, even within one chip. Further, the minimum level is different for different chips. It is the automatic offset control (AOC) that raises the minimum value of the dark level to a predetermined value, and maintains the raised value as the dark level.

In the gain control, data read from the white reference board is first written into an SRAM of a white shading circuit, for example. Then, the VCPU 74a reads the data from the SRAM and samples it at predetermined pixel intervals, and obtains the maximum value for each chip. Afterwards, gain control is carried out so that the maximum value is equal to "200", for example in the scale of 256 gray levels. In the offset control, the dark level is written into the SRAM of the white shading correction circuit. Then, the VCPU 74a reads the data from the SRAM and samples it at predetermined pixel intervals, and obtains the minimum value for each chip. Afterwards, offset control is carried out so that the minimum value is equal to "10", for example, in the scale of 256 gray levels.

The controls as just mentioned are unsatisfactory, leaving the following defects unsolved Unequal levels are present among the pixels and chip terminals. An image is lack of density in an image area of high density. Nuisance lines appear in this area. A ^WV correction is for correcting such a variation in the dark levels among the pixels. A white shading correction is for correcting a variation in the white levels among the pixels.

In the ^WV dark correction, the data outputted at dark is written into the SRAM of the white shading correction circuit, and then VCPU 74a reads the data out of the memory. The CPU repeats this sequence four times, sums the data, and works out a mean value of the summed data. Finally, it writes the mean value into the SRAM of the dark shading correction circuit. Accordingly, at the time of those controls, the VCPU 74a has selected and set the through conversion table shown in FIG. 24(b).

Following the gain control, the offset control, and the ^WV correction, the copying machine is ready for an copying operation. In the copying operation, the logarithmic table is selected, and reference data is written into the SRAM of the white shading circuit before the copying machine enters a copy cycle. This data write processing is to write image data as read from the white reference board after the above controls, and the ^WV dark correction as well have been completed. Accordingly, the data written into the SRAM is expressed by $$\log (Dw - DD),$$

where Dw is the data from the white reference board, and DD is the correction data as stored in the SRAM of the dark shading correction circuit.

The white shading correction circuit makes a difference between the data as set in its SRAM and data as read from an original during an actual copy cycle. In this case, the data Dx as read from the original is first subjected to a ^WV dark correction in the dark shading correction circuit, and hence the difference is $$\log (Dx - DD) - \log (Dw - DD).$$

That is, as the result of the corrections by the dark shading circuit and the white shading circuit, the following correction is made for the density signals $$\log (Dx - DD) - \log (DW - DD)$$

$$= \log (Dx - DD)/(DW - DD) = \log R$$

and the reflecting signal is subjected to the following correction $$R = (Dx - DD)/(Dw - DD)$$

Thus, the ^WV dark correction based on the black signal is applied to the reflecting signal before it is logarithmically converted. The shading correction based on the white signal is applied to the density data after it is logarithmically converted. Accordingly, the correction may be effectively carried out with a less number of correction values. The correction processing to store correction data of one line in the SRAM and to make the subtraction of the data allows use of a general purpose full-adder IC, providing a simple arithmetic operation. Accordingly, there is no need of using the hard logic divider of large scale and complicated circuitry, which is indispensable for the conventional machine.

(II-5) IIT Control

(A) Outline

The image input terminal (IIT) remote has the functions of: sequence control for various types of copying operations; service support; self check; and fail safe. The sequence control of the IIT remote consists of a normal scan mode, a sample scan mode, an initialize mode. Various types of commands and parameters used for the IIT control are transferred from the SYS remote to the IIT remote by serial communication.

Figure 27A:
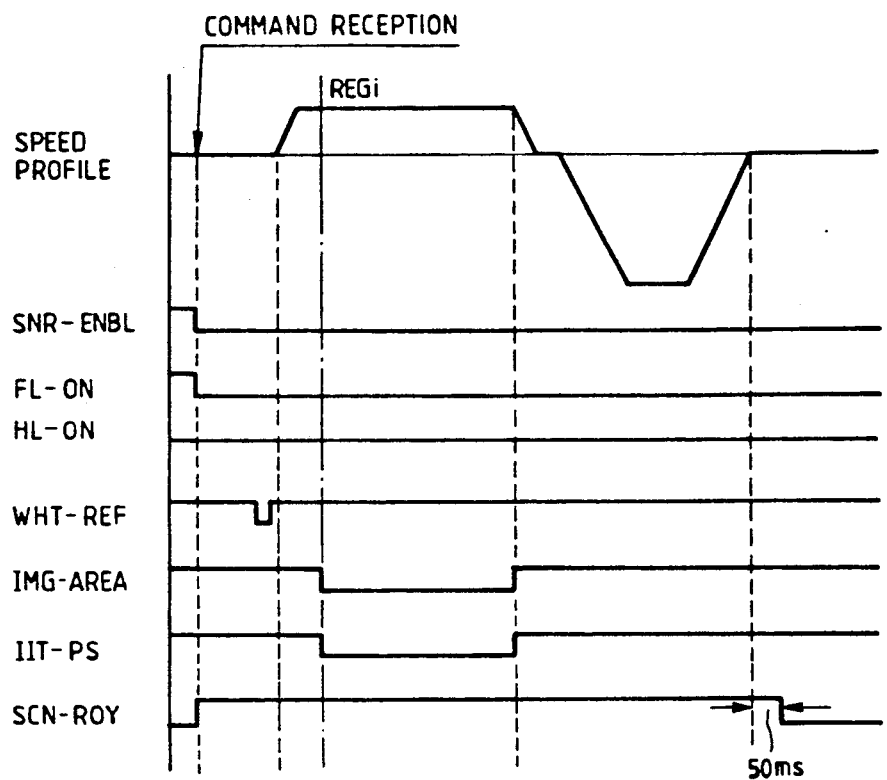
FIG. 27(a), 27(b) and 27(c) show a set of waveforms useful in explaining a control mode of the image input terminal (IIT)

FIG. 27(a) shows a timing chart of the normal scan mode.

In the normal scan mode, scan-length data, paper length, and magnification are determined within the range of 0 to 432 mm (varied in the step of 1 mm), and scan speed is determined on the basis of magnification (50% to 40%). Prescan data (of the distance between the stop position and the registration position) is also set depending on magnification (50% to 400%).

In the normal scan mode, upon receipt of a scan command, control issues a FL-ON signal to light on the fluorescent lamp, and issues a SCN-RDY signal to turn on the driver motor. After a predetermined time, control issues a shading correction pulse WHTREF to start a scan. When the imaging unit reaches the registration position, an imaging area signal IMG - AREA goes low and stays low for a time duration amounting to a predetermined scan length. In synchronism with this, an IIT−PS signal is sent to the IPS.

Figure 27B:
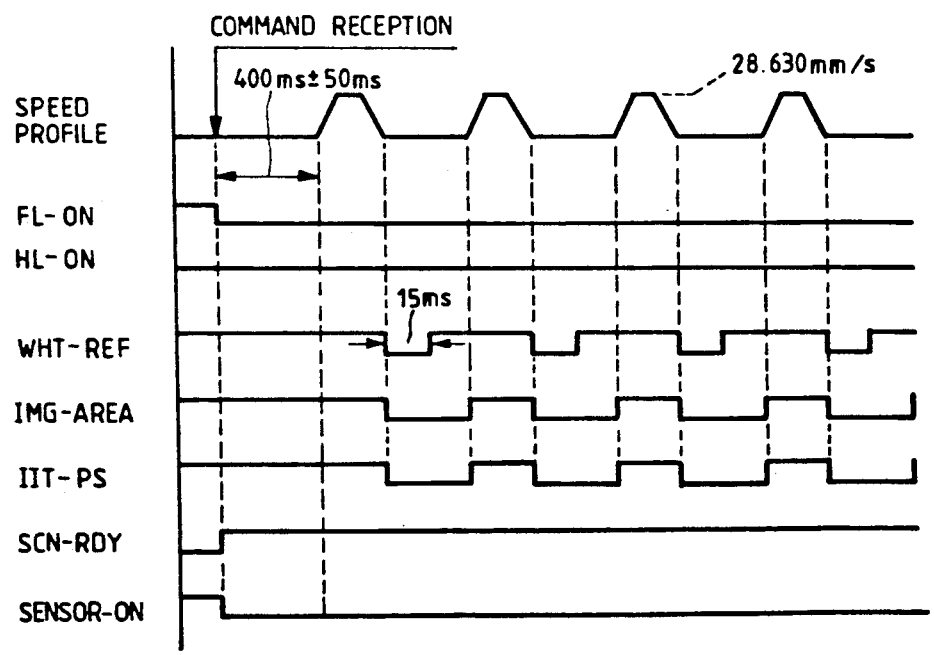

FIG. 27(b) shows a timing chart of the sample scan mode.

The sample scan mode is used for color detection at the time of color change, color balance correction when the F/P is used, and shading corrections. In the sample scan mode, by the data on the distance from the registration position to the stop position, moving speed, the number of minute operations, and step intervals, the imaging unit is moved to an intended sample position, and temporarily stopped there. After the minute operation is repeated several times, it is stopped, to gather sample data.

Figure 27C:
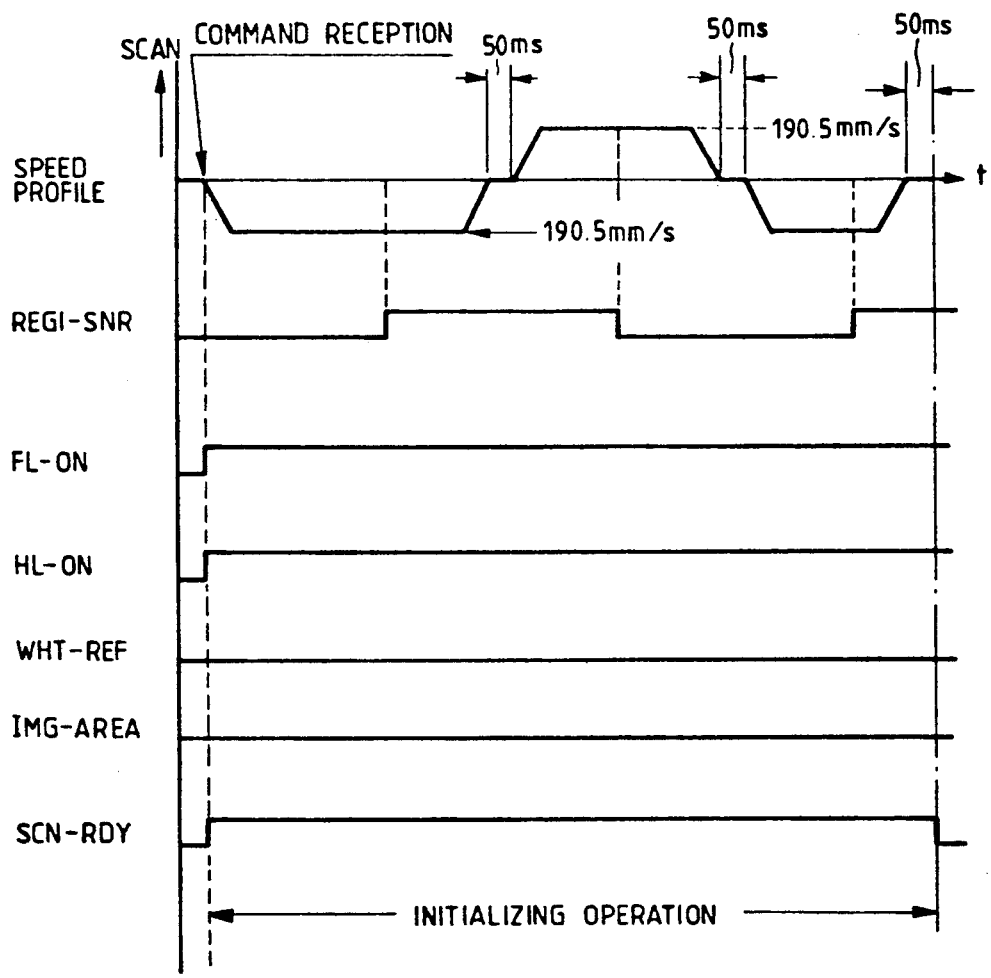

FIG. 27(c) shows a timing chart of the initialize mode.

In the initialize mode of the IIT, when receiving a command from the SYS remote at the time of power on, control checks the registration sensor, checks an operation of the imaging unit by the registration sensor, and corrects the home position of the imaging unit by the registration sensor.

(B) Preheating the CCD Line Sensor

In reading an original, the stability of the read characteristic of the CCD line sensor is significant. The read characteristic of the CCD line sensor depends largely on the temperature of the CCD line sensor. The temperatures of the CCD line sensor must be kept at appropriate values to stabilize the read characteristic of the CCD line sensor. Preheating is used to keep the CCD at appropriate values.

The CCD line sensor is heated to a high temperature by the heat generated internally or by external heat sources. The heat generated in the CCD line sensor depends on the frequency of the drive clock signal. Therefore, the heat quantity is proportional to the clock frequency.

In copying machines, facsimiles, and the like, the drive clock frequency is generally 3 to 10 MHz which generates a large heat quantity. An amplifying element may provide one external heat source for the CCD line sensor. The amplifying element, which converts charge to voltage, is formed at the output terminal of the CCD line sensor. A drive circuit for the CCD line sensor may also provide one of the external heat sources. As shown in FIG. 19, the circuit board 227 on which the CCD line sensor drive circuit is mounted is disposed near the CCD line sensor 226. The ICs, mounted on the circuit board also generate heat. The heat quantity of the CCD line sensor drive circuit is great, and greatly influences the line sensor 226.

Thus, there are many ways to heat the CCD line sensor. By convention, electric power is constantly fed to the line sensor which tends to heat the line sensor up to a high temperature. A line sensor constantly placed at high temperature suffers from reduced lifetime. If its heat resistance is large, the line sensor will be destroyed.

The output level of the CCD line sensor increases as the temperature rises. When the temperature distribution inside the line sensor is not uniform, density data read from an original is different for different reads. One of the causes of such a phenomenon is characteristic variance among the CCD line sensors created during manufacturing. In the instant copying machine using five channels of CCD line sensors, characteristic variance among the channels is inevitable.

Figure 28A:
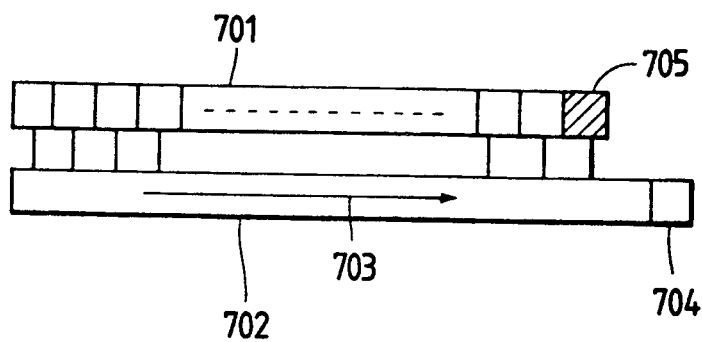
FIGS 28(a) and 28(b) show a schematic illustration of a CCD line sensor, which is useful in explaining the non-uniformity of the temperature distribution within the CCD line sensor.

Temperature distribution may be nonuniform for many reasons. FIG. 28(a) is a schematic illustration of a CCD line sensor. Charge stored in a charge storage section consisting of effective picture elements (pixels) 701 and a shield pixel 705 is transferred to a charge transfer section 702. The charge is serially transferred in the direction of arrow 703, by a drive clock signal. The charge is converted into a voltage by an amplifying element 704, and is outputed in the form of density data. As described above, the amplifying element 704 serves as a heat source which heats the effective pixels near the shield pixel.

Figure 28B:
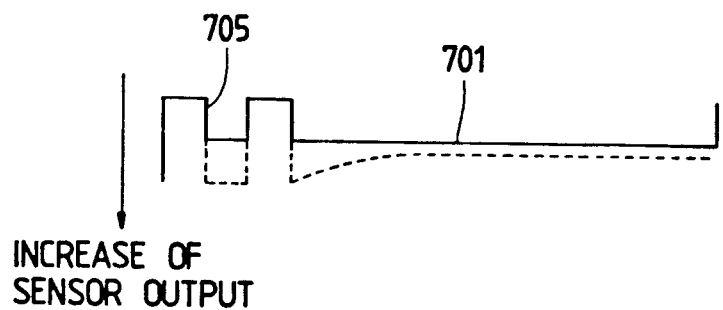

The output level of heated pixels is increased. The effective pixels disposed distant from the shield pixel are only marginally heated which increases their output levels only slightly. Essentially, an output level of the effective pixel 701 should be equal to that of the shield pixel 705 at the time of dark outputting, as indicated by a solid line in FIG. 28(b). Actually, heat radiation from the amplifying element 704 creates a nonuniform temperature distribution inside the line sensor. When the temperature of the shield pixel 705 and the pixels near it rises, the sensor output level distribution of the line sensor is deviated from that of the solid line, as indicated by a dotted line in FIG. 28(b). The output level of the shield pixel 705 is grounded by a clamp circuit succeeding to the line sensor, and the grounded level is used as a block reference level. Where the temperature distribution is not nonuniform, a density variation is caused.

The constantly driven state of the CCD line sensor creates many problems. To cope with the problems electric power may be supplied to the CCD line sensor only during a read state. This idea creates other problems, however.

Figure 29A:
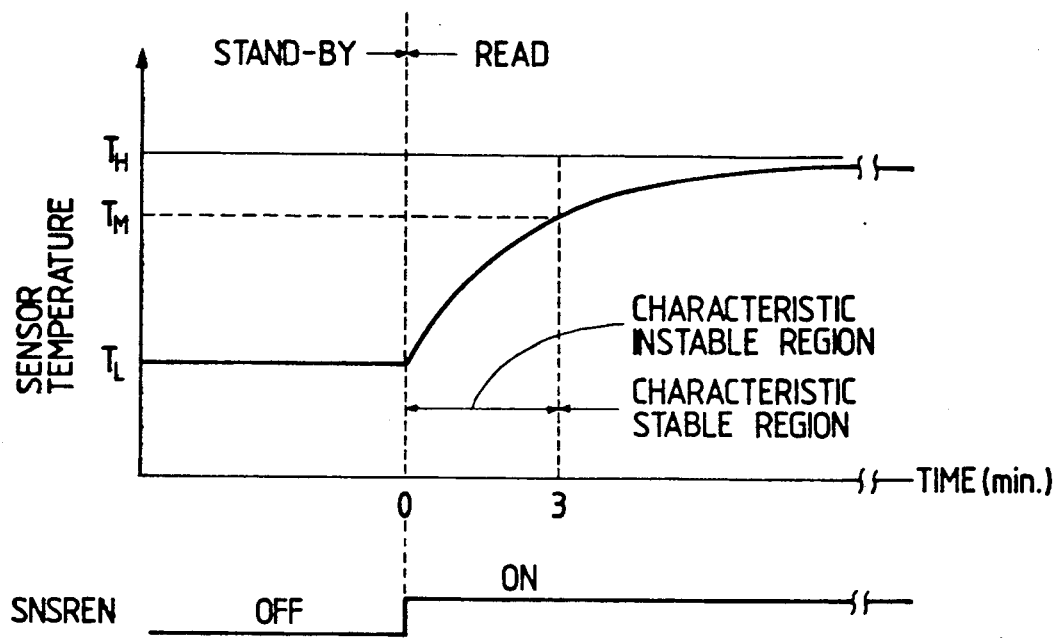
FIG. 29(a) and 29(b) show graphs useful in explaining the problems involved in the image reading apparatus.
Figure 29B:
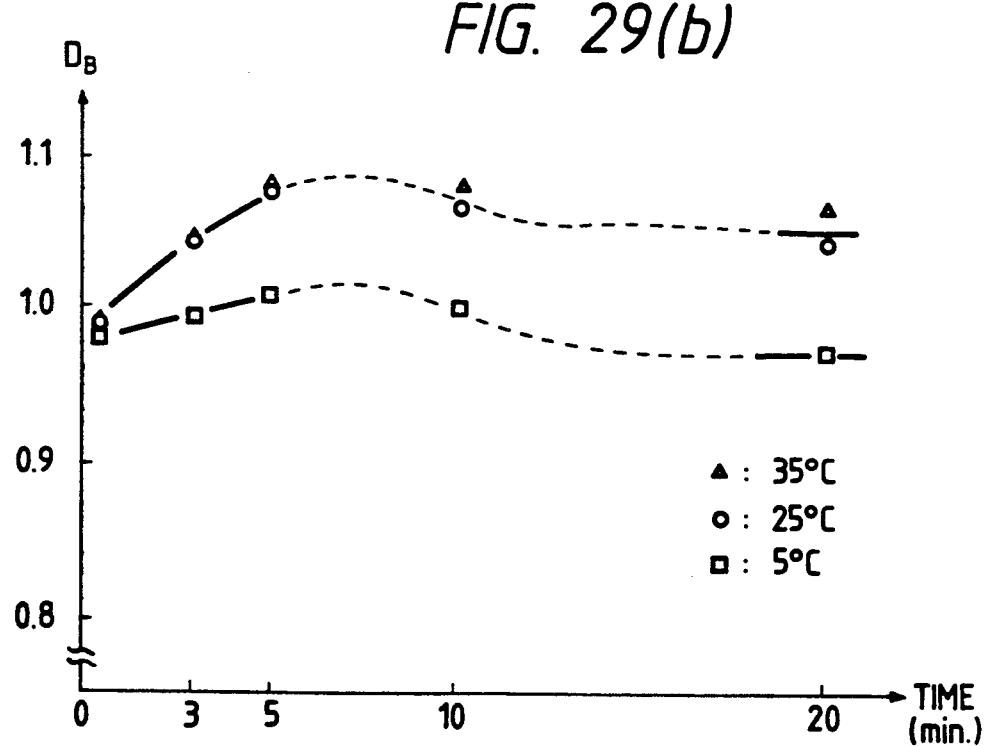
Figure 30:
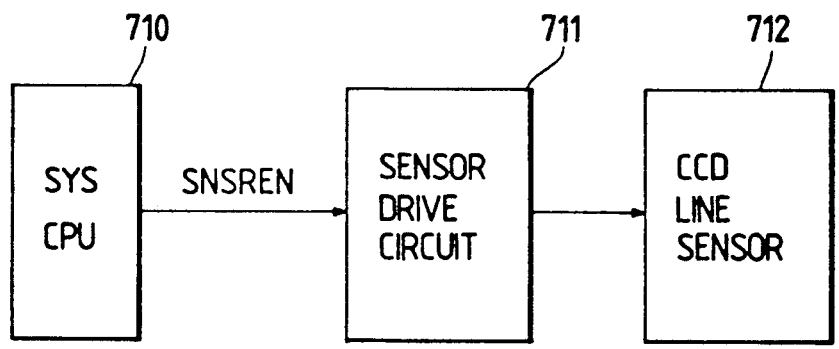
FIG. 30 is a block diagram showing a sensor preheating system according to a first embodiment of the present invention.

After power on, the temperature of the CCD line sensor rises tracing a curve as shown in FIG. 29(a). When the stand-by state period is relatively long, the CCD line sensor radiates heat and its temperature drops and traces a rectilinear line $T_L$ indicating a relatively low temperature. Temperature $T_L$ is approximately 10° C., higher than normal room temperature. When the room temperature is 20° C., the $T_L$ is about 30° C. If an image read is instructed and power is fed to the CCD line sensor, the temperature of the line sensor gradually rises. After about three minutes, the temperature reaches $T_M$ (a50° C.), and the read characteristic of the line sensor settles down. However, the temperature rise will continue until a heat radiation measure is taken to limit the temperature rise to $T_H$ (about 70° C). The CCD line sensor is then kept at the temperature $T_H$. As seen in FIG. 29(a), during the three minute period before the read characteristic of the CCD line sensor becomes stable, the characteristic is instable and fluctuates. A typical variation of the read characteristic of the CCD line sensor is shown in FIG. 29(b). Output levels of blue densities $D_B$ for a yellow original read at 3, 5, 10, and 20 minutes after the line sensor is started up are plotted, with parameters of room temperatures. As seen from the graph, when the CCD line sensor is not operated during the non-read time the image read characteristic varies in the initial stage, causing different densities to be read out for the same original.

As seen from the above description, constantly driving the CCD line sensor reduces the lifetime, while turning off the CCD line sensor during non-read time creates an instable read characteristic. To solve the problems, the CCD line sensor, in a stand-by state, is kept at a temperature which does not reduce the lifetime, but secures the stability of the read characteristic. This is the preheating according to the present invention.

A first embodiment of the present invention will be described with reference to the accompanying drawings.

Referring to FIG. 1, in the instant copying machine, the SYS remote unit 1 sends a sensor enable signal SNSREN, as a control signal, to a sensor drive circuit 3 of the IIT remote to drive the CCD line sensor 4. The sensor drive circuit 3 feeds current to the CCD line sensor 4 only during periods in which the sensor enable SNSREN is at a high logic level (H). By this signal, the CCD line sensor 4 is enabled.

Figure 31:
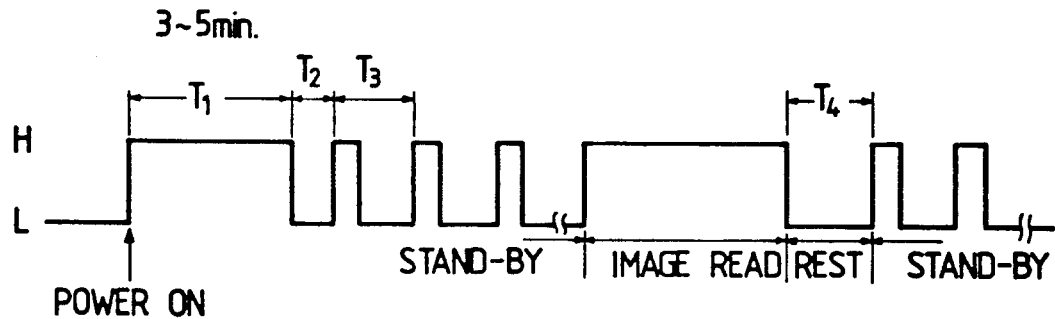
FIG. 31 is one of the profiles of a sensor enable signal SNSREN used in the sensor preheating system shown in FIG. 30.

The sensor enable signal SNSREN has a profile as shown in FIG. 31. Upon power on, the signal goes logic level high (H). This H state continues for a predetermined period T1. During this period, current is fed to and heats the CCD line sensor. After the period T1, the control signal goes logic level low (L) and this L state continues for a period T2. The CCD line sensor is in a rest state during this period. No current is fed to the CCD line sensor during the rest state. Thereafter, a pulse recurs at a preset duty ratio with a period T3, and the CCD line sensor enters a stand-by state. During the stand-by state, the line sensor is preheated.

During an image read state, the sensor enable signal SNSREN is sustained in a continuous H state. After completion of the read operation, it is in an L state during the period T4. During this period, no current is fed to the CCD line sensor and accordingly, the CCD line sensor is in a rest state. Then, it is placed in a stand-by state, and a pulse recurs at the preset duty ratio with the period T3.

Following the description of the profile of the sensor enable signal SNSREN, the time lengths of the periods T1, T2, T3, and T4 will be described. At the time of power on, the CCD line sensor is cooled to room temperature. Accordingly, it is necessary to preheat the line sensor to ensure a stable read characteristic before the power source is turned on. When the read instruction is issued, the CCD line sensor will be able to read an image with a stable read characteristic. When the CCD line sensor is heated for a long time, the sensor temperature rises excessively reducing the sensor's lifetime. Accordingly, the period T1 is preferably 3 to 5 minutes. The period T2 is preferably one minute or its near figure. T2 is relatively short because only a slight drop in the sensor temperature is required and the read characteristic must remain stable.

The duration of the stand by pulse period T3 will be described. During the period that pulses recurring at the period T3 are applied to the CCD line sensor, conduction and nonconduction are alternately repeated in the CCD line sensor. Accordingly, the temperature of the CCD line sensor alternately rises and drops. Since the thermal response of the CCD line sensor is relatively slow, the period T3 may be relatively long. However, an excessively long period T3 leads to large temperature variations, reducing the lifetime of the CCD line sensor. The period T3 is preferably in the order of seconds, e.g., 1 to 10 seconds.

Figure 32:
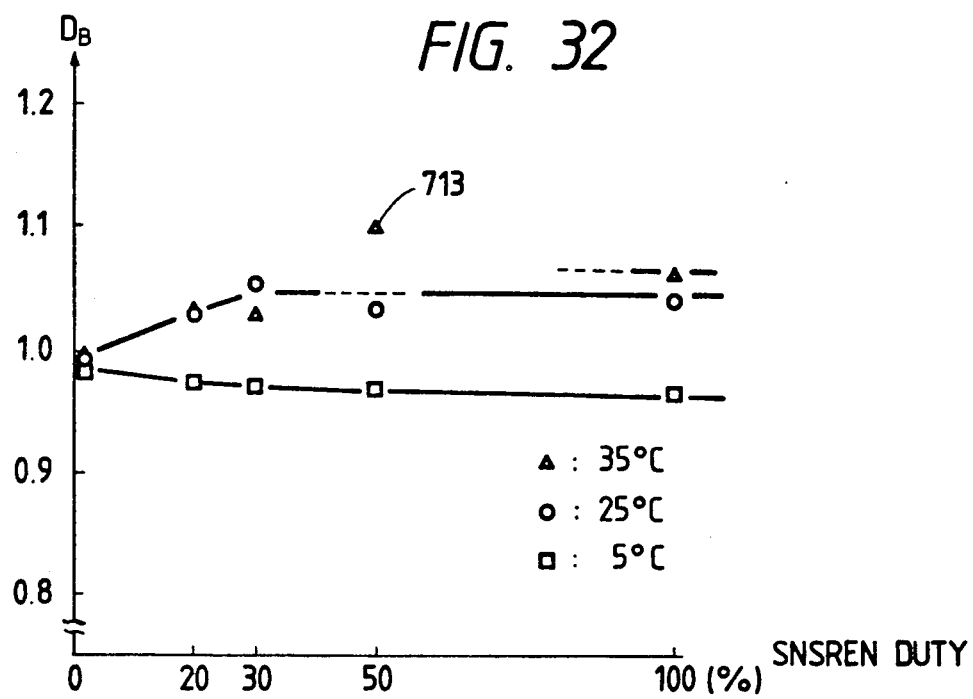
FIG. 32 is a graph showing the output density vs. duty ratio for the first embodiment.

The ratio of time in which the pulse is at logic level H and the total period T3 is the duty ratio. The duty ratio of the pulse is preferably 30% or its near figure. The reason for this follows. In FIG. 32, as in FIG. 29(b), the output levels of blue density DB for a yellow original read at duty ratios 0, 20, 30, 50, and 100% is plotted after preheating for 20 minutes, with parameters of room temperature. As seen from the graph, the density varies in the range of 0 to 30%, and is stable in the range higher than 30%. The density at measuring point 713 is off a characteristic curve defined by measured values. The density point 713 is negligible because it is an abnormal value caused by an unknown reason. Satisfactory preheating can, therefore, be obtained if the duty ration is set at 30% or higher.

An increased duty ratio of the pulse applied to the CCD line sensor indicates an increased time of feeding current to the line sensor. The quantity of the heat generated in the line sensor and the sensor drive circuit may become large. Therefore, it is not preferable to use a duty ratio higher than 30%. A 30% duty ratio guarantees a minimum quantity of heat generated in the sensor drive circuit, and a minimum surface temperature of the package of the circuit, while maintaining a stable read characteristic.

During the period T4, the image reader is in the rest state. The temperature of the CCD line sensor is decreased from the high temperature required for the image reading operation. During this period, the temperature of the CCD line sensor is not decreased further than the temperature needed to stabilize the read characteristic. The time required to meet the above requirement is about one minute.

Figure 33:
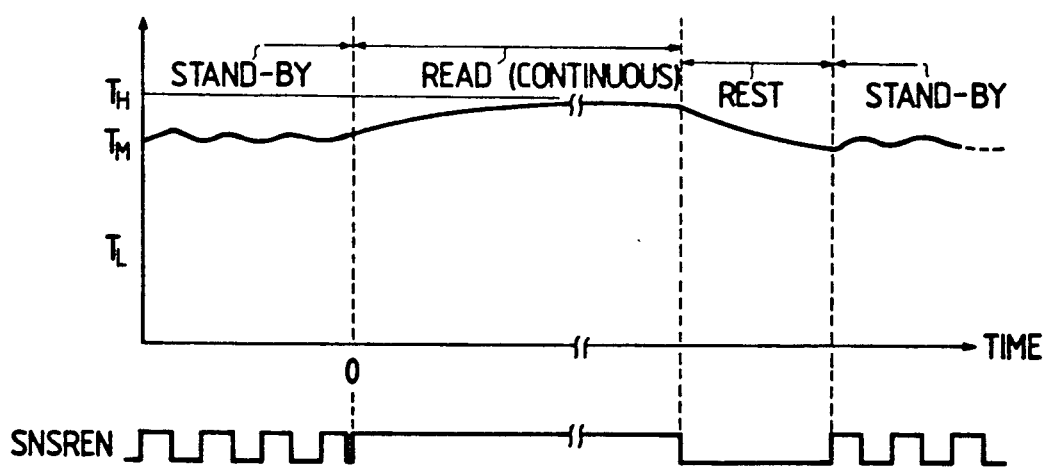
FIG. 33 is a graph showing a variation of sensor temperature when the preheating system according to the present invention is exercised.

FIG. 33 shows the variation of CCD line sensor temperature with respect to time when T1=5 minutes, T3=3 seconds, duty ratio=33.35 (conduction time=1 sec and non-conduction time=2 sec), and T4=1 minute. As shown in the graph, in the stand-by state, the CCD line sensor is kept at temperature $T_M$ (about 50 centigrade) by preheating. The read characteristic of the line sensor at the temperature $T_M$ is stable. As the read operation progresses during the read state, the temperature of the CCD line sensor rises. However, a heat sink operates to keep the maximum temperature of the line sensor at temperature $T_H$ (about 70 centigrade). A rest state follows the image read operation. During the rest state, no current is fed to the CCD line sensor, and the CCD line sensor temperature drops gradually. When the temperature reaches $T_M$, the stand-by state is activated. During the stand-by state, the sensor temperature is kept at approximately $T_M$ through preheating.

Thus, the CCD line sensor is preheated to a temperature which does not reduce the lifetime of the CCD line sensor, but still stabilizes the read characteristic of the CCD line sensor. Therefore, the resultant reproduced image has good quality with little density variation. Further, to implement the preheating system, the hardware is not modified, only a minor change in the software of the SYSCPU 10 is required and the variation of the sensor enable signal SNSREN is profiled as shown above. Therefore, the preheating system may be realized without incurring a high cost.

In the above-mentioned embodiment, the duty ratio and the rest state period T4 are set at fixed values. If required, those values may be changed. The temperature of the CCD line sensor varies with room temperature. As the room temperature rises the CCD line sensor temperature rises. In this case, the preheating time can be reduced by a time length corresponding to the increase of the CCD line sensor temperature. The duty ratio of the pulses applied to the CCD line sensor during the stand-by state can be changed depending on the room temperature as derived from a sensor installed to sense the room temperature.

The temperature of the CCD line sensor after the image read operation varies with the number of copies made. Accordingly, as the read time becomes longer, the CCD line sensor temperature becomes higher. By making use of this fact, the period T4 may be changed in accordance with the number of set copies, or the number of image recordings. The period T4 may be set for each copy. Practically, however, the CCD line sensor temperature after N copies are made is substantially equal to the sensor temperature after (N+1) copies are made. Accordingly, the period T4 may be changed every 10 copies. For example, T4=20 sec for 1 to 10 copies, and T4=3 min. for 91 to 100 copies. This is easily realized because the SYSCPU 10 counts the number copies. The rest period T4 can then be set using a table storing different rest periods T4 corresponding to different number of copies.

The temperature of the CCD line sensor depends on the operating time of the CCD line sensor and the number of CCD line sensor operations. The CCD line sensor temperature increases as the operation time increases and the number of scans increases. Therefore, the rest state period T4 may be set depending on the accumulated value of the number of read operations, the number of scans, or the operating time of the CCD line sensor.

In the above-mentioned embodiment, during the period T1 immediately after power on, the duty ratio is 100%. If required, a heavy duty ratio of about 90% may also be used.

While described in the context of a close contact type CCD line sensor it is evident that the present invention may be applied to a reduction type CCD line sensor which is used in combination with a reduction optical system.

Figure 34A:
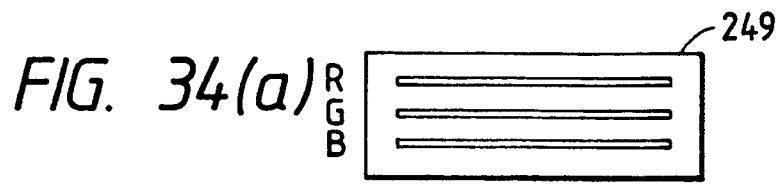
FIGS. 34(a) and 34(b) show schematic illustrations of a reduction type CCD line sensor.
Figure 34B:
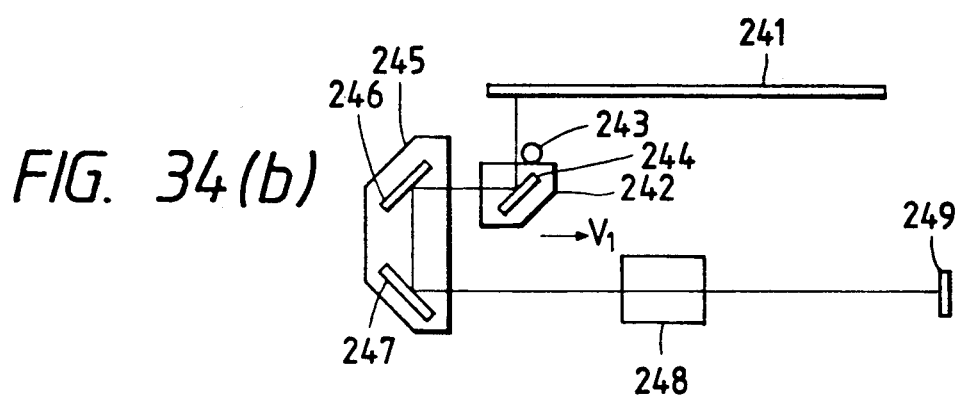

An example of the reduction type CCD line sensor is shown in FIG. 34. In FIG. 34(a) showing a structural arrangement of a reduction type CCD line sensor 249, the separated color signals red, green, and blue are simultaneously derived from separate line sensors R, G, and B. FIG. 34(b) shows a schematic illustration of an image read system using the reduction type CCD line sensor 249. A fluorescent lamp 243 illuminates an original on a platen glass 241. Mirrors 242, 246, and 247 transmit light reflected from the original, and an optical lens 248 is disposed between CCD line sensor 249 and mirror 247. Light reflected off the original is reduced and focused on the CCD line sensor 249. The mirror 242 is moved in the vertical scan direction to read the original. The mirrors 246 and 247 are moved synchronously at half the speed of the mirror 242, thereby keeping the length of the optical path constant.

If the present invention is not employed, there is a danger of destroying the CCD line sensor 249 due to temperature rise. The temperature distribution within the CCD line sensor may not be uniform. Therefore, the present invention is applicable to the reduction type CCD line sensor.

A second embodiment of the present invention will now be described.

In the first embodiment, the current feed to the CCD line sensor is directly controlled. The essential function of the preheating is to keep the line sensor at the preset temperature. Hence, a heater may be used for preheating.

Figure 35:
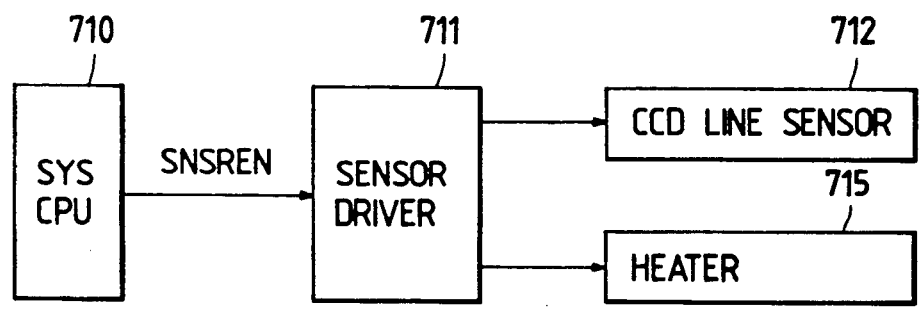
FIG. 35 is a block diagram showing a sensor preheating system according to a second embodiment of the present invention.

As shown in FIG. 35, a heater 715 is disposed near a CCD line sensor 712. In response to a sensor enable signal SNSREN, a sensor driver 711 controls the feed and no feed of current to the heater 715. A profile of a variation of the sensor enable signal SNSREN is the same as in the first embodiment and is shown in FIG. 31. The heating time of a ceramic heater may be changed with changes in room temperature. The rest time following the image read operation may be changed in accordance with the accumulated value of the number of copies, the number of image readings, the number of scans by the sensor, or the operation time.

When a heater is used, the CCD line sensor is always preheated to provide a stable read characteristic.

Any type of heater which can be disposed near the CCD line sensor 712 may be used for the heater 715. Since the line sensor is generally mounted on a ceramic substrate, a ceramic heater is preferably formed on the rear side of the ceramic substrate. If the heater is so formed, the path of the wiring to the heater can be formed like that of the wiring to the CCD line sensor. This is a very convenient feature.

Figure 36:
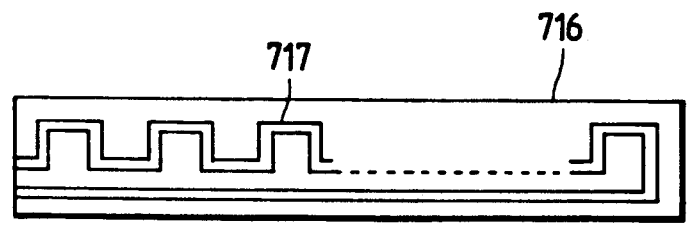
FIG. 36 shows a structure showing a ceramic heater mounted on the rear side of a ceramic substrate bearing a CCD line sensor of the obverse side.

As shown in FIG. 36, the ceramic heater may be formed with a predetermined pattern 717 mounted on the rear side of a ceramic substrate 716 bearing the CCD line sensor on the obverse side by means of silver paste.

As seen from the foregoing description, according to the present invention, the CCD line sensor in the stand-by state is kept at a temperature which has little adverse effect on the lifetime and stabilizes the read characteristic. The resultant reproduced image suffers from little density variation. The CCD line sensor has a longer lifetime than the conventional one. The reliability of the image reading apparatus is remarkably improved.

The foregoing description of preferred embodiments of the invention has been presented for purposes of illustration and description. It is not intended to be exhaustive or to limit the invention to the precise form disclosed, and obviously many modifications and variations are possible in light of the above teachings or may be acquired from practice of the invention. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. An image reading apparatus operable in a read state and a stand-by state, comprising:
    an image sensor;
    drive circuit means for transferring current to said image sensor in response to a control signal;
    means for generating said control signal, said control signal having a constant preset level during the read state and said control signal having alternate first and second levels alternating at a duty ratio during the stand-by state;
    wherein current is continuously transferred to said image sensor during the read state and current is intermittently transferred to said image sensor at said duty ratio during the stand-by state, and wherein said duty ratio is altered in accordance with room temperature.

2. An image reading apparatus as claimed in claim 1, wherein said image sensor is a charge-coupled device.

3. An image reading apparatus as claimed in claim 2, wherein said duty ratio is at least 30 percent.

4. An image reading apparatus as claimed in claim 1 wherein said duty ratio decreases as the room temperature increases.

5. An image reading apparatus operable in a read state, a rest state, and a stand-by state, comprising:
    an image sensor;
    drive circuit means for transferring current to said image sensor in response to a control signal;
    means for generating said control signal, said control signal having a constant preset first level during the read state, said control signal having a constant preset second level during the rest state, and said control signal alternating between said first level and said second level at a duty ratio during the stand-by state;
    wherein current is continuously transferred to said image sensor during the read state, no current is transferred to said image sensor during the rest state, and current is intermittently transferred to said image sensor at said duty rate during the stand-by state.

6. An image reading apparatus as claimed in claim 5, wherein said image sensor is a charge-coupled device.

7. An image reading apparatus as claimed in claim 6, wherein said duty ratio is at least 30 percent.

8. An image reading apparatus as claimed in claim 7, wherein said duty ratio is altered in accordance with room temperature.

9. An image reading apparatus as claimed in claim 8 wherein said duty ratio decreases as the room temperature increases.

10. An image reading apparatus as claimed in claim 5 or 9 wherein the duration of the rest state is preset.

11. An image reading apparatus as claimed in claim 5 or 9 wherein the duration of said the rest state is altered in accordance with the duration of the read state.

12. An image reading apparatus as claimed in claim 11 wherein the duration of the rest state is increased as the duration of the read state is increased.

13. An image reading apparatus as claimed in claim 5 or 11 wherein the duration of the rest state is altered in accordance a number of images previously read.

14. An image reading apparatus as claimed in claim 13 wherein the duration of the rest state is increased as the number of images previously read is increased.

15. An image reading apparatus operable in a read state and a stand-by state, comprising:
   an image sensor;
   a heater formed in proximity to said image sensor for heating said image sensor, said heater generating heat when said heater receives a current;
   drive circuit means for transferring current to said heater in response to a control signal;
   means for generating a control signal, said control signal having said constant preset level during the read state and said control signal having alternate first and second levels alternating at a duty ratio during the stand-by state;
   wherein current is continuously transferred to said heater during the read state and current is intermittently transferred to said image sensor at said duty ratio during the stand-by state.

16. An image reading apparatus as claimed in claim 15, wherein said image sensor is a charge-coupled device.

17. An image reading apparatus as claimed in claim 16, wherein said duty ratio is at least 30 percent.

18. An image reading apparatus as claimed in claim 17, wherein said duty ratio is altered in accordance with room temperature.

19. An image reading apparatus as claimed in claim 18 wherein said duty ratio decreases as the room temperature increases.

20. An image reading apparatus operable in a read state, a rest state, and a stand-by state, comprising:
   an image sensor;
   a heater formed in proximity to said image sensor for heating said image sensor, said heater generating heat when said heater receives a current;
   drive circuit means for transferring current to said heater in response to a control signal;
   means for generating said control signal, said control signal having a constant preset first level during the read state, said control signal having a constant preset second level during the rest state, and said control signal alternating between said first level and said second level at a duty ratio during the stand-by state;
   wherein current is continuously transferred to said heater during the read state, no current is transferred to said heater during the rest state, and current is intermittently transferred to said heater at said duty rate during the stand-by state.

21. An image reading apparatus as claimed in claim 20, wherein said image sensor is a charge-coupled device.

22. An image reading apparatus as claimed in claim 21, wherein said duty ratio is at least 30 percent.

23. An image reading apparatus as claimed in claim 22, wherein said duty ratio is altered in accordance with room temperature.

24. An image reading apparatus as claimed in claim 23 wherein said duty ratio decreases as the room temperature increases.

25. An image reading apparatus as claimed in claim 20 or 24 wherein the duration of the rest state is preset.

26. An image reading apparatus as claimed in claim 20 or 24 wherein the duration of the rest state is altered in accordance with the duration of the read state.

27. An image reading apparatus as claimed in claim 26 wherein the duration of said the rest state is increased as the duration of the read state is increased.

28. An image reading apparatus as claimed in claim 20 or 24 wherein the duration of the rest state is altered in accordance a number of images previously read.

29. An image reading apparatus as claimed in claim 28 wherein the duration of the rest state is increased as the number of images previously read is increased.

* * * * *